Dec. 12, 1967     C. J. STALEGO     3,357,807
METHOD AND APPARATUS FOR FORMING AND
PROCESSING CONTINUOUS FILAMENTS
Original Filed Dec. 8, 1961     9 Sheets-Sheet 1
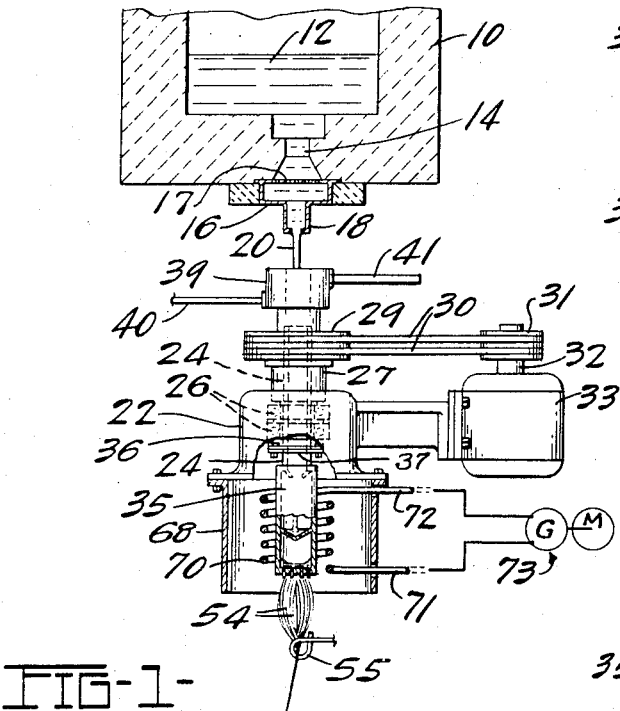
FIG-1-
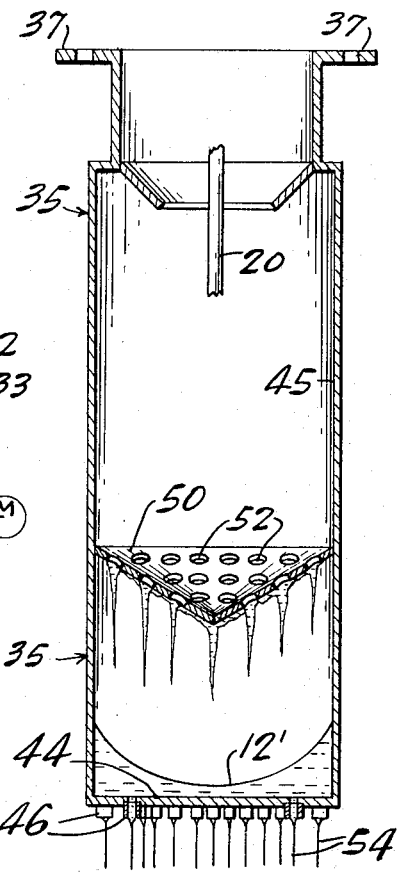
FIG-2-
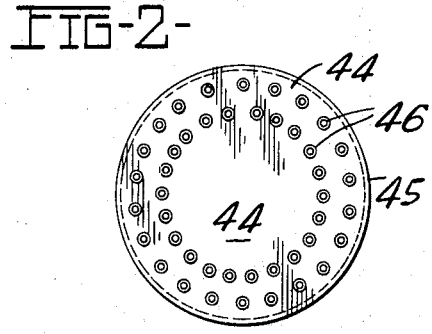
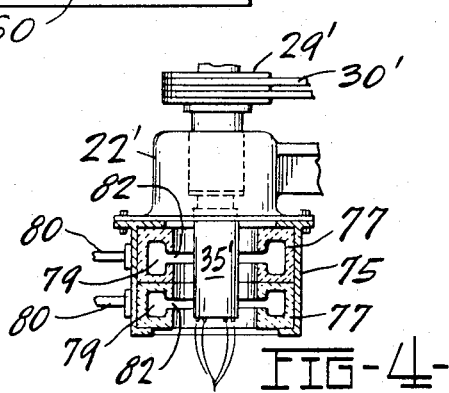
FIG-3-
FIG-4-
INVENTOR:
CHARLES J. STALEGO.
BY
ATTYS.

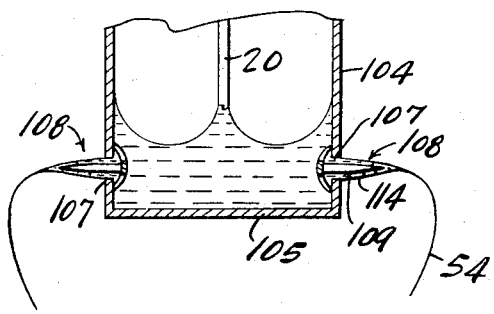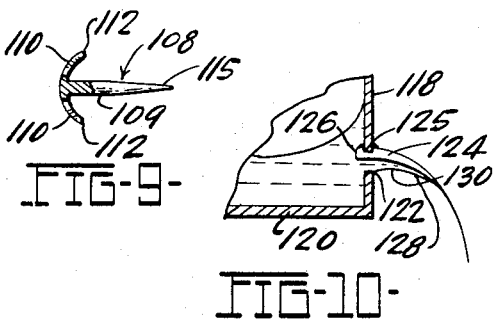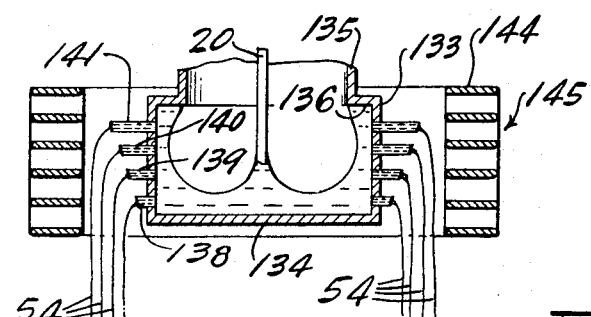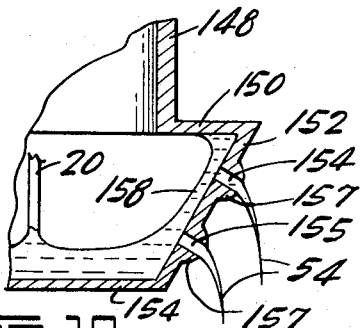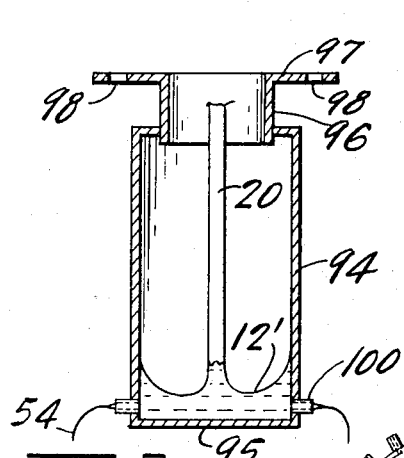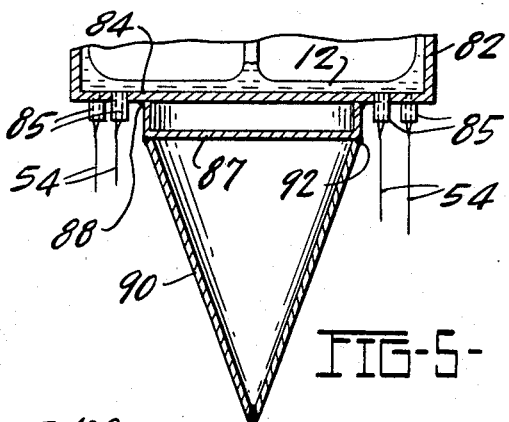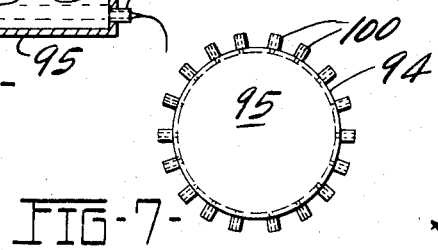
INVENTOR:
CHARLES J. STALEGO.
BY
ATTYS.

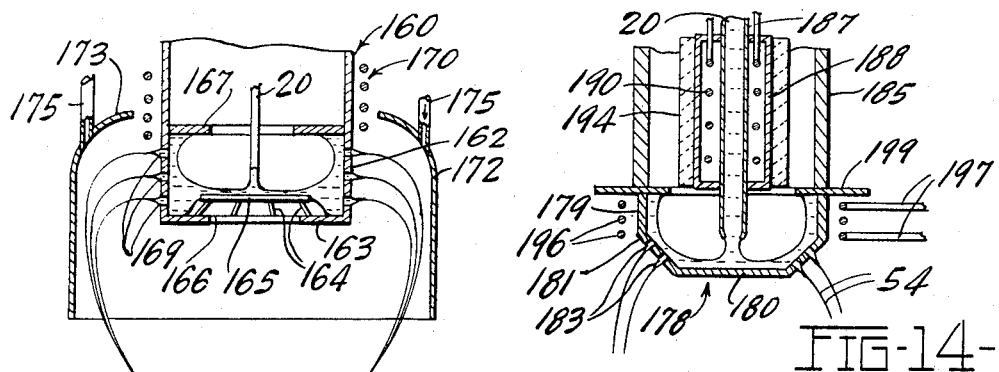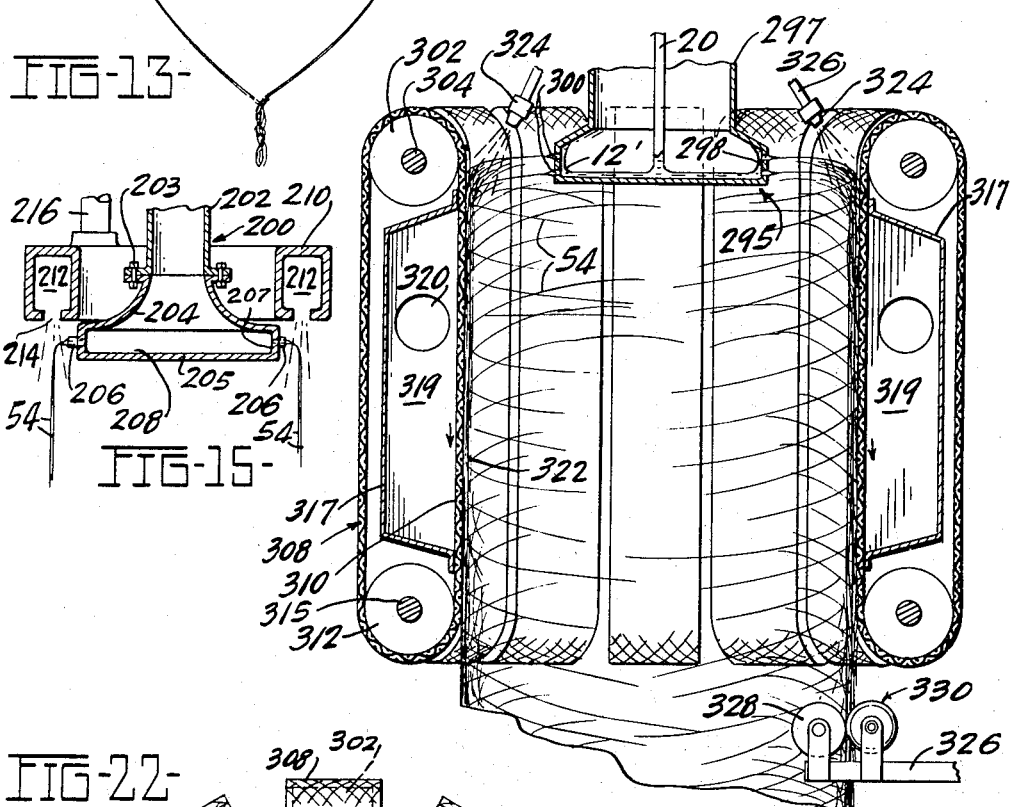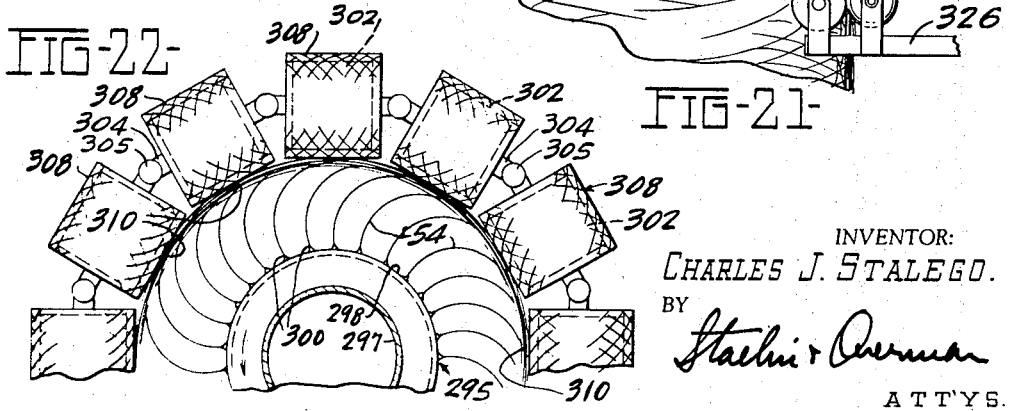

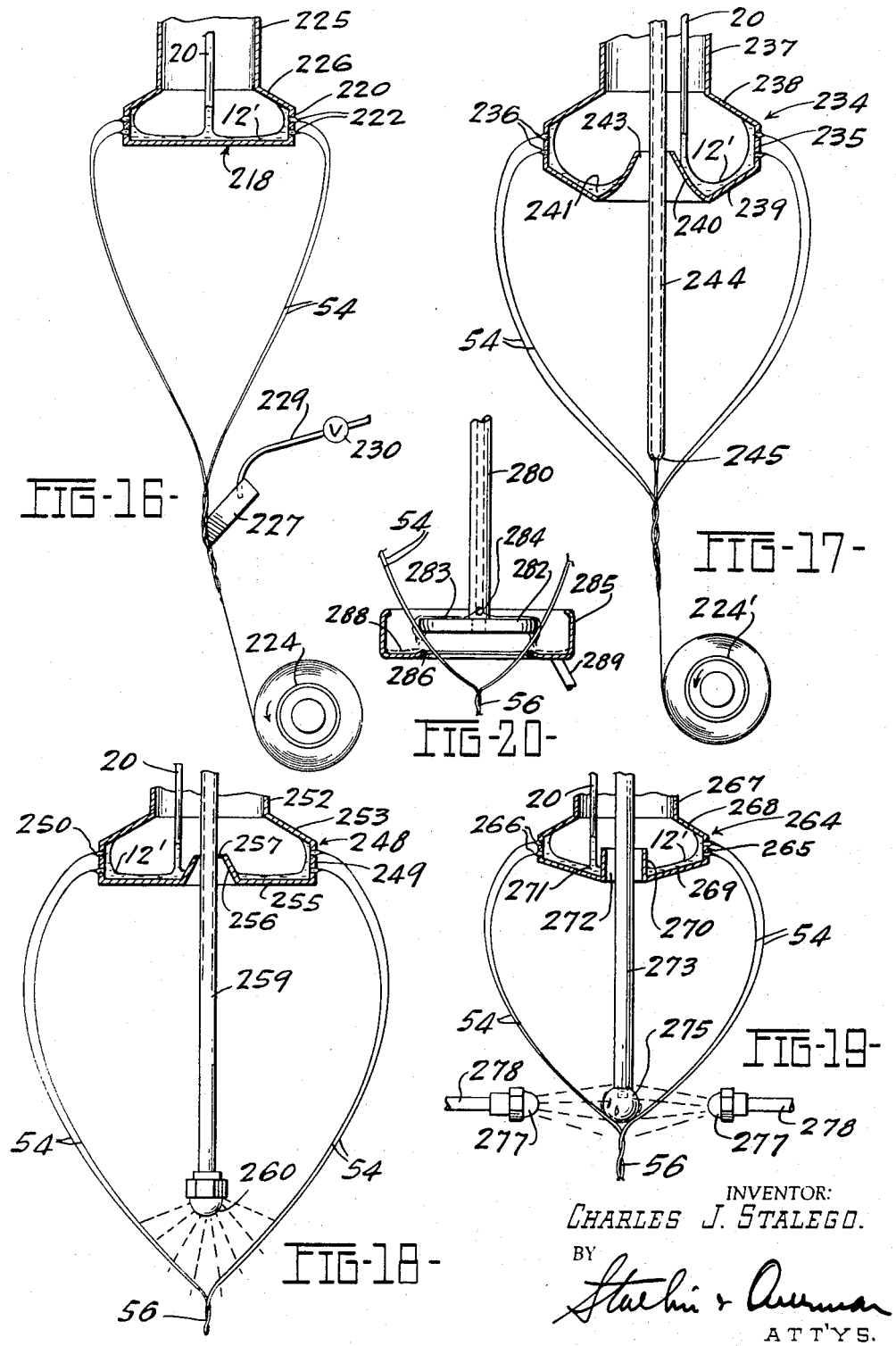

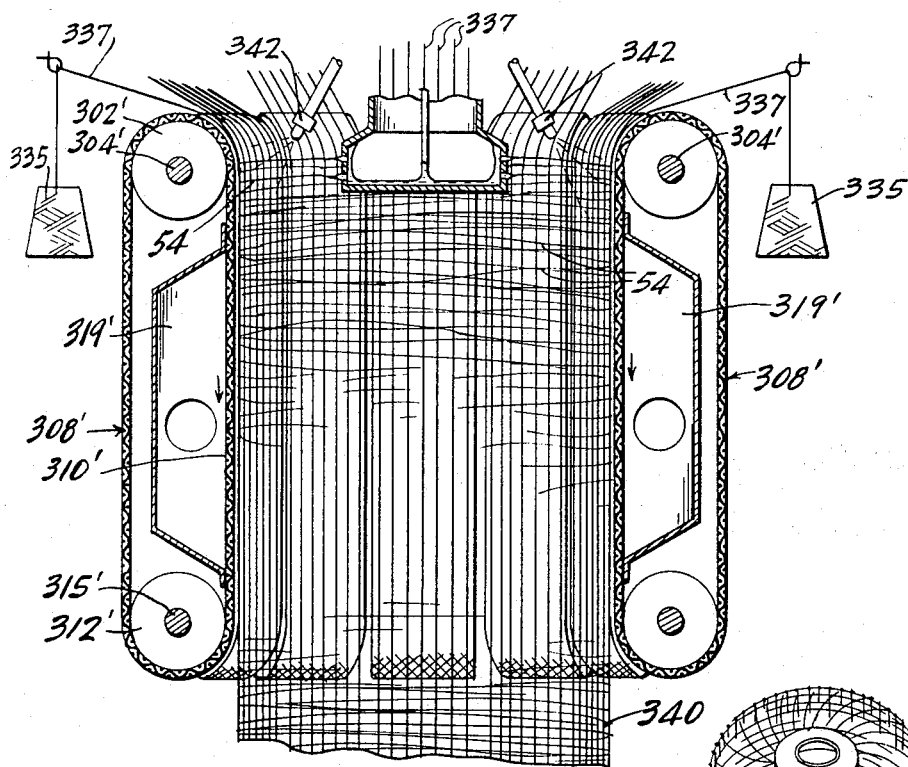
FIG-23-
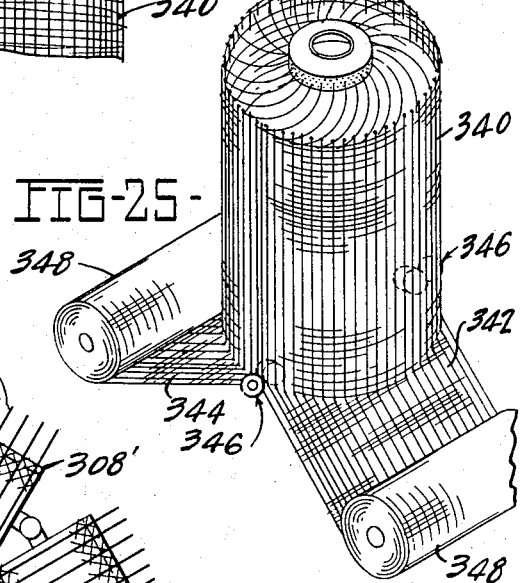
FIG-25-
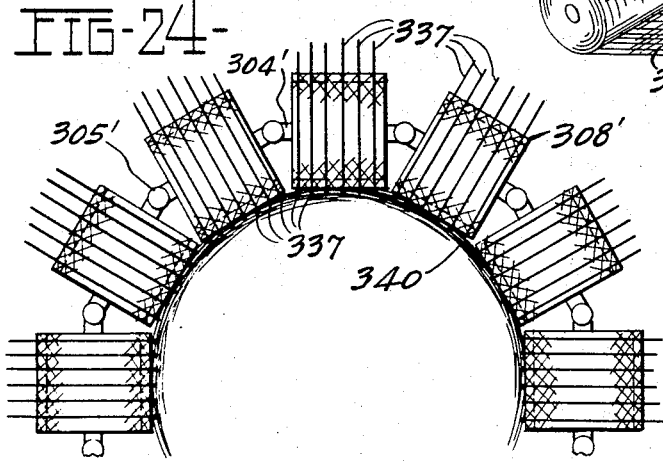
FIG-24-

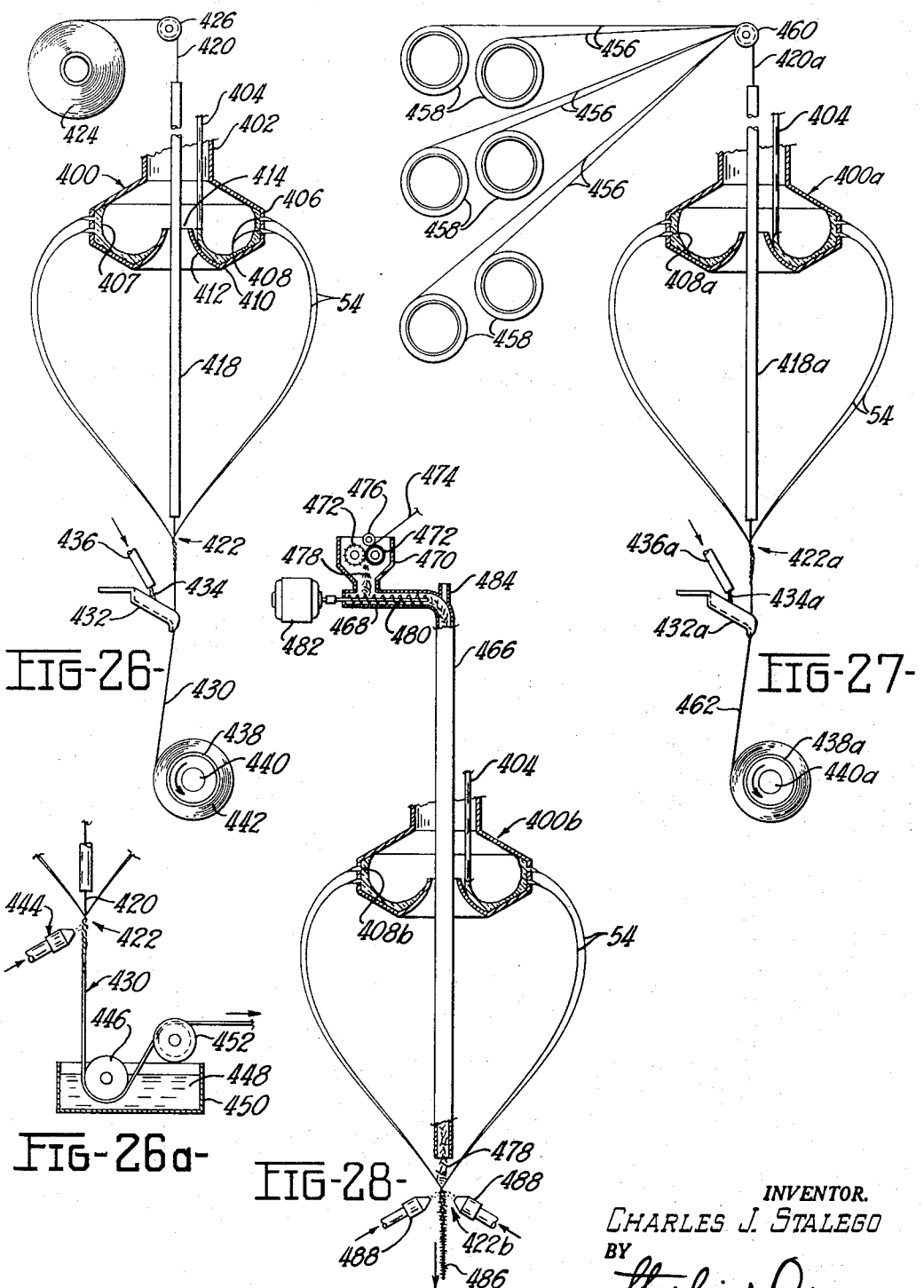

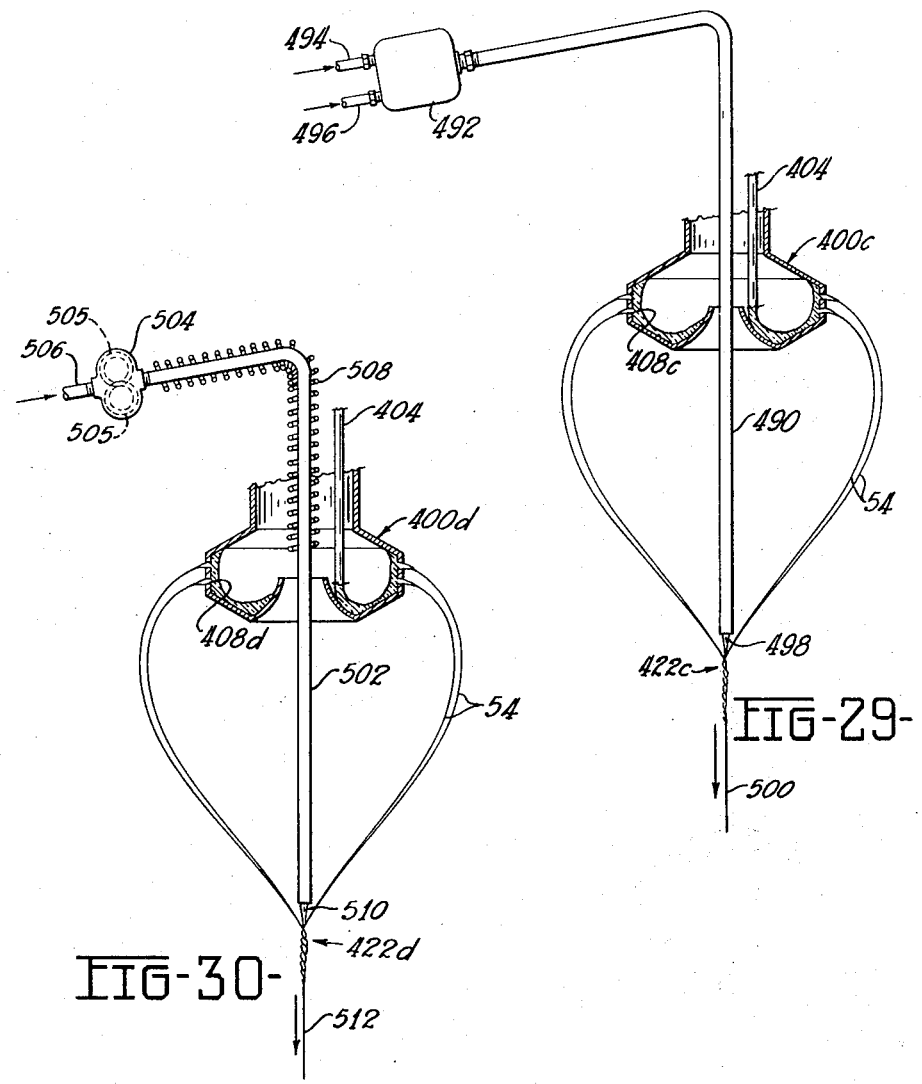

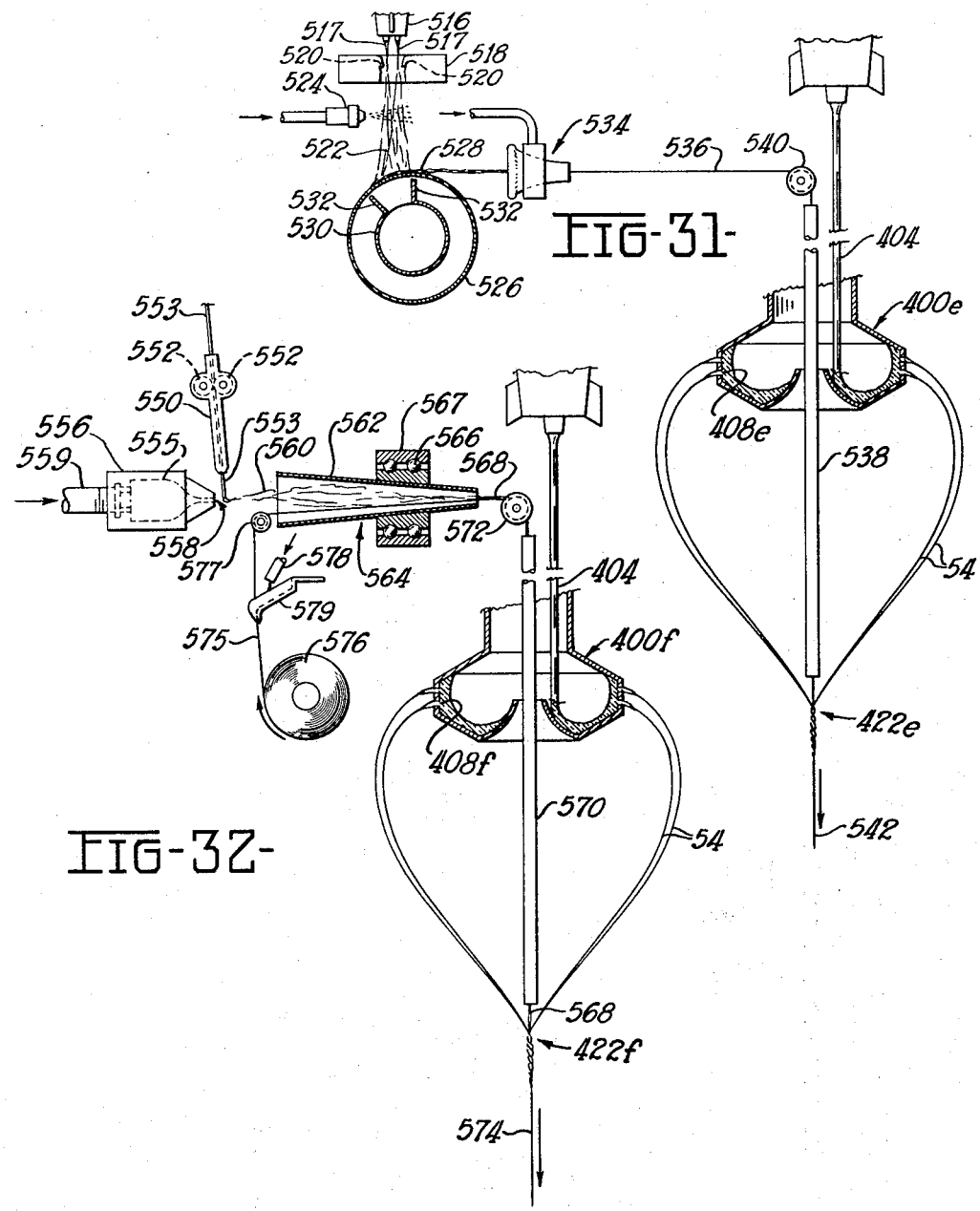

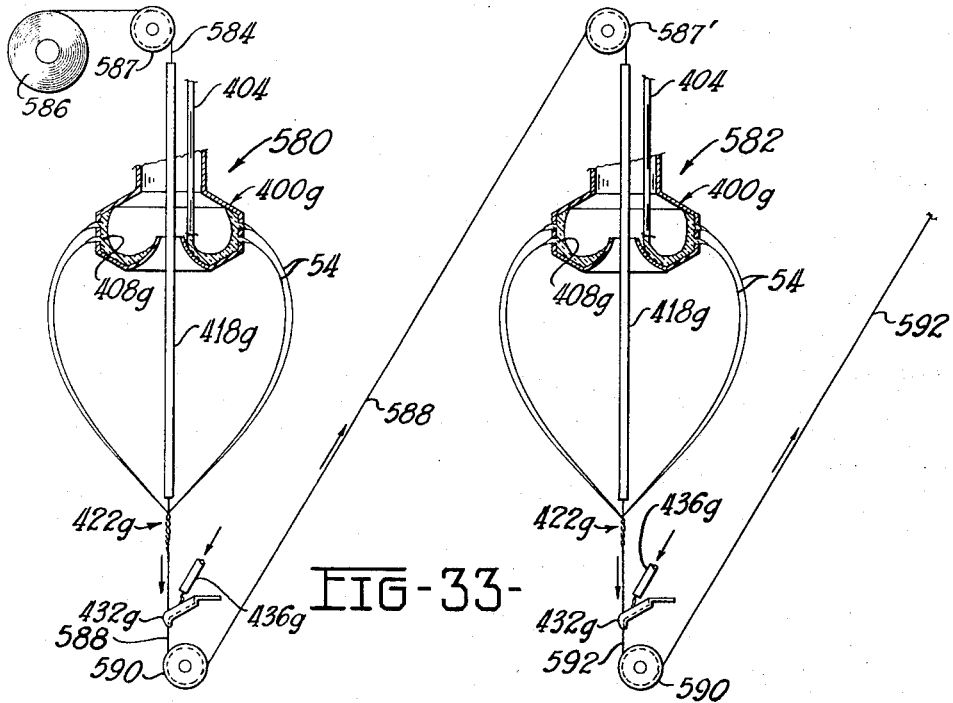

United States Patent Office 3,357,807
Patented Dec. 12, 1967

3,357,807
METHOD AND APPARATUS FOR FORMING AND PROCESSING CONTINUOUS FILAMENTS
Charles J. Stalego, Newark, Ohio, assignor to Owens-Corning Fiberglas Corporation, a corporation of Delaware
Original application Dec. 8, 1961, Ser. No. 158,041, now Patent No. 3,250,602, dated May 10, 1966. Divided and this application Oct. 21, 1965, Ser. No. 499,180
2 Claims. (Cl. 65—6)

This is a division of my copending application Ser. No. 158,041, filed Dec. 8, 1961, now Patent No. 3,250,602 which is a continuation-in-part of my application Ser. No. 670,731 filed July 9, 1959, issued into Patent 3,032,813.

This invention relates to method of and apparatus for forming and processing fibers or filaments and more especially to the formation of continuous fine filaments formed of glass or other heat-softenable material and processing the continuous filaments into twisted slivers, threads, yarns, rovings, mats, fibrous packs and other end products formed therefrom.

Various methods have been employed heretofore in forming and processing filaments into threads, yarns, or the like, by drawing or attenuating the filaments into a group or sliver collected on a drum, spool or the like and the collected sliver subsequently twisted per se or twisted with other groups of filaments to form threads, rovings, yarns or other textile formations. Furthermore mats of continuous filaments have heretofore been unsatisfactory because of difficulties encountered in collecting the filaments.

The present invention embraces the provision of a method for forming continuous filaments from glass streams or streams of other heat-softened mineral materials wherein the streams are rotated, which rotation is effective to twist the continuous filaments or fibers into a twisted sliver, thread or yarn as the continuous filaments or fibers are being formed from the streams.

An object of the invention resides in an apparatus for rotating streams of glass and attenuating the streams during their rotation into continuous filaments and simultaneously twisting the filaments as they are formed.

An object of the invention is the provision of a method of and apparatus for spinning continuous filaments from a rotor containing a body of heat-softened mineral material, such as glass, applying a lubricant, binder or coating material to the continuous filaments and twisting the coated filaments into a strand, thread or yarn as the filaments move away from the spinning zone.

Another object of the invention resides in a method for extruding continuous bodies of heat-softened material, such as glass, whereby filaments formed from the bodies are very fine in diameter and wherein a large number of filaments may be gathered together and twisted to form a twisted strand, thread or yarn.

Another object of the invention is the provision of rotating means for discharging bodies of heat-softened material wherein the means is formed with special orifices or spinning tips which avoid flooding whereby continuous fine filaments may be attenuated from the bodies.

Another object of the invention resides in a method of attenuating bodies to continuous filaments by rotating means and gathering the filaments into a group whereby the fracture or breaking of one or more filaments does not interrupt the process as the broken filament or filaments under the influence of rotation are automatically gathered into the filament group.

Another object of the invention resides in a method and means for heating or maintaining a supply of filament-forming material in attenuating condition and preventing premature chilling of the filaments or material whereby satisfactory attenuation of the material to fine filaments is obtained at high linear speeds.

Another object of the invention resides in a configuration of rotor construction for delivering bodies therefrom in substantially concentric circular rows whereby there is no interference of the filaments formed from material discharged from the rotor and which are gathered into a group by twisting resulting from rotation of the rotor.

Another object of the invention is the provision of material discharge orifices in a rotor fashioned or shaped in a manner to prevent flooding or excessive discharge of filament-forming material from the rotor.

Still a further object of the invention is the provision of a method of continuous filament attenuation wherein a gaseous blast may be employed to assist in the attenuation of the bodies of heat-softened material discharged from a rotor.

Another object of the invention embraces a method of forming a fibrous mat structure utilizing continuous filaments of glass or other mineral material attenuated by rotatable means.

Another object of the invention resides in the provision of means for accumulating continuous filaments formed by centrifugal forces into a continuous, generally tubular pack which may be severed to form lengths or strips for various end uses.

Still a further object of the invention is the provision of a method and means of assembling reinforcing strands, threads or yarns with continuous filaments to provide a fibrous mat, web or pack having high strength characteristics.

Another object of the invention is the provision of a method of and means for assembling newly formed filaments with materials such as natural or inorganic fibers, chopped strand, rovings, yarns, viscous materials, rubber, foam resins, foils, wire, cable or other materials.

Another object of the invention resides in a method of and means for winding newly formed continuous filaments on an electrical conductor whereby an insulating covering is provided by directly winding the filaments on the conductor or core.

Another object of the invention resides in a method of and apparatus for forming a composite product with continuous newly formed filaments where the filaments may be assembled with fibrous or filamentary materials such as staple roving, inorganic fiber yarns, natural fiber yarns with or without binder or coating material to produce a roving having advantageous characteristics of bulk, improved strength, resilience and wherein the end product is endowed with a substantial yield or stretch.

Another object of the invention resides in the method of and apparatus for winding newly formed continuous filaments on a core which may be of circular or polygonal cross section and where a product of substantial thickness is desired, a plurality of linear bodies, rovings, yarns or slivers may be covered simultaneously, the number of yarns or rovings determining the bulk of the product.

Another object of the invention resides in a method of and apparatus for forming a continuous linear product wherein nonmetallic core materials such as organic fibers, natural fibers in yarn or roving form, multiple slivers of continuous or staple fiber may be produced which may be usable as cable fillers, vermin proof crack fillers, wrap around insulation for chemical wear, filters, cushion upholstering, wicks and the like and for uses where temperature and chemical resistance is desired, or the filaments combined with fibers of plastic or plastic strips depending upon the end use for the product.

Another object of the invention resides in a method of and apparatus for forming a composite product wherein chopped strand or sliver or chopped inorganic fibers combined with newly formed continuous filaments providing a cord or linear product wherein the ends of chopped strand, sliver or other fibers project to impart a fluffy appearance for decorative purposes.

Another object of the invention resides in a method of and apparatus for forming a composite product wherein newly formed fibers attenuated from heat-softenable material are delivered through a region at which newly formed continuous filaments envelope concomitantly attenuated staple fibers, the latter forming a staple core structure with a continuous filament surface area providing a composite product having resilience coupled with high strength characteristics having a high degree of flexibility or resilience.

Another object of the invention resides in the method of and apparatus for forming a product wherein a core is overlaid or wrapped with one or more layers of continuous filaments formed of heat-softened material to provide a product having high strength characteristics but which is flexible and pliable to accommodate the same for many and various uses.

Another object of the invention resides in a method of and apparatus for combining or merging newly formed continuous filaments with viscose resin, uncured or partially cured rubber or the like into an integrated composite product through the adhesive or bonding characteristics of the resin or rubber.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a semidiagrammatic elevational view, with certain parts shown in section, of an apparatus for performing steps in the method of the invention;

FIGURE 2 is a vertical sectional view through the form of rotor or spinner construction shown in FIGURE 1 embodying filament-forming material discharge means;

FIGURE 3 is a bottom plan view of the arrangement shown in FIGURE 2;

FIGURE 4 illustrates a form of heating means for maintaining the filament-forming material in filament-forming condition within the rotor;

FIGURE 5 illustrates a modified arrangement of the type of rotor construction shown in FIGURE 3;

FIGURE 6 is a vertical sectional view illustrating another form of rotor construction for discharging bodies of filament-forming material;

FIGURE 7 is a bottom plan view of the construction shown in FIGURE 6;

FIGURE 8 is a sectional view of a portion of a rotor illustrating a particular form of material discharge guide means provided in a wall of the rotor;

FIGURE 9 illustrates one of the filament-forming material guiding elements of the rotor shown in FIGURE 8;

FIGURE 10 is a sectional view of a portion of a rotor equipped with another form of guiding means for the material discharged through an adjacent orifice in the rotor wall;

FIGURE 11 is a vertical sectional view through a rotor construction equipped with orifice means for discharging bodies of filament-forming material in spaced concentric paths;

FIGURE 12 is a fragmentary sectional view of a modified form of rotor construction for discharging material through orifices arranged in concentric rows;

FIGURE 13 is a semidiagrammatic sectional view illustrating another form of rotor construction and enclosure at the filament-forming region;

FIGURE 14 is a sectional view illustrating another form of rotor construction and means for heating the filament-forming material;

FIGURE 15 is a sectional view of a rotor and an arrangement providing a gaseous blast assisting in the attenuation of filaments from a heat-softened material;

FIGURE 16 illustrates a form of rotor construction and a means for delivering binder or coating material onto the filaments;

FIGURE 17 illustrates a modified form of rotor construction and an applicator for delivering binder or coating material onto the continuous filament;

FIGURE 18 illustrates another form of rotor construction and means for delivering binder or coating material onto the filaments;

FIGURE 19 illustrates another form of rotor construction and means for delivering binder or coating material onto the filaments;

FIGURE 20 illustrates another arrangement for applying binder or coating material onto continuous filaments;

FIGURE 21 illustrates a filament collecting system or apparatus for forming a pack or mat of continuous filaments;

FIGURE 22 is a top plan view of the arrangement shown in FIGURE 21;

FIGURE 23 is a semidiagrammatic view illustrating a method of forming a reinforced pack or mat of continuous filaments.

FIGURE 24 is a top plan view of the arrangement shown in FIGURE 23;

FIGURE 25 is a diagrammatic isometric view showing a method of severing the circular mat or pack to form the same into strips;

FIGURE 26 is a sectional view of a rotor of a filament-forming unit associated with an arrangement for wrapping or embracing a linear core with newly formed continuous filaments;

FIGURE 26a illustrates another form of treatment of the product formed by the apparatus shown in FIGURE 26;

FIGURE 27 is a view similar to FIGURE 26 wherein a plurality of linear bodies are combined to form a core arranged to be wrapped or embraced by newly formed continuous filaments;

FIGURE 28 is a view similar to FIGURE 27 illustrating a means of reducing a strand of fibers or filaments to short lengths arranged to be assembled or wrapped with continuous filaments;

FIGURE 29 is illustrative of an apparatus for assembling or combining foam rubber or foam resin with newly formed continuous filaments;

FIGURE 30 illustrates an apparatus for feeding a flowable resin while maintaining the resin at a predetermined temperature to condition the resin for assembly with newly formed continuous filaments;

FIGURE 31 is a schematic sectional view illustrating apparatus for forming and orienting of discrete fibers into a linear core and wrapping or embracing the core with newly formed continuous filaments;

FIGURE 32 is a schematic view, partly in section, illustrating an arrangement for combining newly formed staple fibers into a core arranged to be embraced or wrapped with continuous filaments, and FIGURE 33 is a sectional view of a plurality of continuous filament forming units arranged whereby a linear core or body is wrapped or embraced by successive layers of newly formed continuous filaments.

The method and apparatus of the invention are especially adaptable and usable for forming continuous filaments of fibers of heat-softenable material such as glass and processing the filaments into products such as twisted strands, threads or yarns or forming packs or mats of the filaments or forming products wherein various form and types of core structure are embraced, wrapped, sheathed or combined or assembled with one or more layers of continuous filaments concomitantly with the formation of the continuous filaments to effect the production of novel composite linear products comprising core structures and over layers of continuous filaments which may be further processed for various purposes and uses.

With particular reference to the structural arrangement of FIGURES 1 through 3, and initially to FIGURE 1, there is illustrated a forehearth construction 10 which is associated with a melting furnace (not shown) in which filament-forming material, such as glass batch, is reduced to flowable or attenuating condition, the forehearth 10 containing a supply 12 of heat-softened glass.

The floor of the forehearth 10 is formed with an opening 14 through which the molten glass 12 flows downwardly into a feeder 16 secured to the bottom wall of the forehearth. A screen 17 may be disposed in the path of flow of the glass into the feeder to avoid the presence of cords, particles of refractory and unrefined components of the glass batch which may be contained in the supply 12.

The feeder 16 may be equipped with one or more hollow tips or projections 18 through which a stream or streams flow from the feeder, there being a single stream of glass 20 discharged from the feeder in the arrangement shown in FIGURE 1.

Disposed beneath the feeder 16 is a frame construction 22 in which a shaft 24 is journally supported in suitable bearings 26 contained within the frame or housing member 22. The shaft 24 projects and extends through a boss portion 27 formed on the member 22. Mounted upon the shaft 24 adjacent the boss 27 is a pulley or sheave 29 connected by means of driving belts 30 with a pulley 31 mounted on the shaft 32 of a motor 33 whereby the motor rotates the shaft 24.

Associated with or secured on the shaft 24 is a rotor or spinner 35 which, in the embodiment illustrated, is secured to the shaft by means of bolts 36 passing through openings formed in flanges 37 provided on the rotor 35 as particularly shown in FIGURE 2. It is to be understood that other means of connecting the rotor with a driving means may be employed or the rotor may be turbine driven.

As shown in FIGURE 1, the glass stream or body of filament-forming material flows into the shaft 24 and is delivered into the interior of the rotor 35. The arrangement may be cooled by means of a suitable jacket 39 surrounding the shaft and provided with an inlet pipe 40 and an outlet pipe 41 whereby a suitable coolant fluid, for example, water, oil or air may be circulated through the jacket.

With particular reference to FIGURE 2, the bottom wall 44 at the terminus of the cylindrically shaped rotor wall 45 is provided with rows of circumferentially spaced tips or projections 46, there being two rows of tips in the embodiment illustrated in FIGURES 2 and 3. The tips 46 may be in the form of comparatively short tubes through which the glass or other filament forming material 12' within the rotor is discharged in the form of streams.

The tips 46 may be fashioned of materials such as platinum rhodium which will withstand the high temperatures of the glass or filament-forming material. The rotor 35 may be provided with one or more perforated members or screens 50 preferably of cone-shaped configuration, as shown in FIGURE 2, which provide a large number of comparatively small openings or perforations 52.

The screen 50 may have its peripheral region welded or otherwise secured to the cylindrical wall 45 of the rotor. The screen 50 interrupts the passage of particles of refractory, stones, stria or cords in the glass so that the glass collected beneath the screen 50 is of substantially homogeneous composition, free from particles which would interrupt uniform flow or delivery of the glass streams through the hollow tips or orifice members 46.

The arrangement shown in FIGURES 1 through 3 is particularly adaptable for performing the method of spinning or attenuating glass or other filament-forming material into continuous filaments, which are gathered together and twisted during their collection. The continuous filaments or fibers 54 may be gathered together in a group by a gathering loop 55 and, due to the rotation of the rotor 35, the individual continuous filaments are twisted under the influence of the rotor to form a twisted sliver or thread 56.

The twisted sliver or bundle of filaments is collected in a suitable manner, as for example, on the periphery of a cylindrical sleeve 59 mounted upon a rotating collet or arbor 60 carried by a shaft 61.

The shaft 61 is driven by suitable belt and pulley means from a motor 64 so that the twisted group of filaments 56 is continuously wound upon the rotating collector sleeve 59. A transverse mechanism 66 is engaged with the twisted group of filaments 56 to cause the same to be oscillated or guided back and forth over the surface of the sleeve 59 whereby the twisted sliver or group of filaments is uniformly distributed over the peripheral area of the sleeve 59 during the winding operations.

The frame or housing member 22 supports a shroud or sleeve 68 which surrounds the rotor in the manner illustrated in FIGURE 1. Means is provided for maintaining the glass or other heat-softenable material within the rotor in a softened or attenuating condition and for controlling the viscosity of the material to obtain the most efficient stream flow and attenuation in order to obtain fine filaments.

In the embodiment illustrated in FIGURE 1, high frequency electrical induction heating is employed or provided for heating and controlling the temperature of the material within the rotor 35.

As shown in FIGURE 1, an induction heating means 70 is disposed adjacent the rotor 35 and within the region defined by the shroud 68, the leads 71 and 72 of which are connected with a source of high frequency current 73. The electrical energy supplied to the induction heater may be varied in order to regulate the heat applied to the rotor and filament-forming material.

The operation of the arrangement shown in FIGURE 1 is as follows: With the rotor 35 in static condition, the induction heater 70 is energized to render the filament-forming material or glass in the rotor in a sufficiently flowable condition to be discharged from the hollow tips 46. The group of filaments 54 is manually threaded through the traverse mechanism 66 and wrapped a few turns around the sleeve 59 of the winding apparatus. The motors 33 and 64 are energized so that as the group of filaments 56 is being wound upon the sleeve 59 the motor 33 rotates the rotor 35 whereby the individual filaments 54 being directed through the gathering device 55 are rotated by the rotor and hence are continuously twisted together to form a twisted sliver or thread 56 which is collected on the sleeve 59.

The amount of twist imparted to the bundle, group or sliver of filaments 56 is dependent upon the linear rate of attenuation of the filaments, that is, the rate in linear feet in a given time wound upon the sleeve 59 in proportion to the number of revolutions of the rotor 35 in the same length of time. Thus, if the linear attenuating or winding speed of the filament group 56 is eight thousand feet per minute and the rotor 35 is revolving eight thousand revolutions per minute, there will be one full twist imparted to the filament group during each foot of travel of the filament group. The rotor 35 may be of a diameter or size which will withstand the centrifugal forces of rotation. If the rotor is of a comparatively small diameter, the same may be rotated at comparatively high speed and the number of twists or turns increased per unit of linear travel of the sliver, bundle or group of continuous filaments.

FIGURE 4 illustrates another form of heating means for maintaining the filament-forming material within the rotor at the proper temperature and viscosity for efficient attenuation. The rotor or spinner 35' is journalled in bearings contained in the housing 22' and is equipped with a pulley 29′ driven through belts 30′ from a motor in the same manner as illustrated in FIGURE 1.

Secured to the support 22′ and depending therefrom is a cylindrically shaped housing or casing 75 of a burner construction adapted to burn a mixture of fuel gas and air under confined conditions and the burned gases utilized for applying heat externally to the rotor or spinner 35′.

Disposed within the casing or housing 75 are annularly shaped members 77 fashioned of high temperature refractory. The members 77 may each be formed as a single annular element or each may be formed in component sections assembled together to form an annular shape.

Each of the members 77 is formed interiorly with an annularly shaped chamber 79 forming a combustion zone or confined region in which a mixture of fuel gas and air or other suitable fuel may be burned. Fuel and air mixture may be supplied to the chambers 79 through tubes or pipes 80. Each of the annular members 77 is formed with a restricted slot 82 forming a restricted outlet or orifice in communication with a chamber 79 and through which the intensely hot burned gases or gases of combustion above the attenuating temperature of the glass are discharged or projected into engagement with the exterior cylindrical surface of the rotor 35′.

In this manner, the heat applied to the rotor 35′ maintains the filament-forming material or glass within the rotor of a proper viscosity whereby streams of the glass flowing through the hollow tips or orifices formed in the rotor wall may be efficiently attenuated into continuous fine filaments. Control of the temperature of the material within the rotor may be had by regulating the amount of fuel and air mixture delivered into the combustion zones or chambers 79.

While the arrangement illustrated in FIGURE 4 embodies two annularly shaped members 77 fashioned with combustion zones, it is to be understood that additional burners may be employed if desired. The hot gases from the combustion chambers 79 may be discharged through a plurality of radially arranged restricted orifices or openings in lieu of the continuous annular slots 82 shown in FIGURE 4.

FIGURE 5 illustrates a rotor 82 of a construction similar to the rotor 35 shown in FIGURES 1 and 2, the rotor 82 being formed with a bottom wall 84 provided with a plurality of hollow tips or tubular members 85 preferably arranged in two or more concentric rows. Secured to the exterior of the bottom wall 84 of the rotor is a cup-shaped member 87 which is welded as at 88 to the bottom wall 84. Depending from the cup-shaped member 87 is a hollow cone-shaped element 90 which may be secured to the cup-shaped member by welding as at 92.

The cup-shaped member 87 and the cone 90 provide means or barriers to prevent the ambient air from chilling or reducing the temperature of the filament forming material 12 adjacent the bottom wall of the rotor. While the element 90 may be of other configuration, it is preferably of cone shape in order not to impede the movement of the continuouse filaments 54 in convergent paths as they are gathered into a sliver and twisted under the influence of rotation of the rotor. The means for preventing temperature reduction of the lower regions of the rotor shown in FIGURE 5 may be utilized with other rotor constructions disclosed and described herein.

FIGURES 6 and 7 illustrate a modified form of rotor construction wherein centrifugal forces of rotation of the rotor assist in the delivery of bodies of filament-forming material from the rotor. In this form, the rotor construction includes a cylindrical wall 94 having a bottom wall 95, the upper region of the rotor being provided with a restricted neck portion 96 formed with an outwardly extending flange 97 provided with openings 98 adapted to receive securing means for connecting the rotor with a rotatable shaft in the manner illustrated in FIGURE 1.

Arranged at the lower region of the cylindrical wall 94 of the rotor is a plurality of radially extending hollow tips or bushings 100 providing orifices or outlets through which filament-forming material such as glass 12′ is delivered in individual bodies which are attenuated to filaments 54 by winding the filaments on a collector as shown in FIGURE 1.

The material 12′ of the stream 20 under the influence of centrifugal forces of rotation of the rotor accumulates adjacent the inner circumferential wall of the cylinder 94 to a substantial depth and such forces serve to assist in the propulsion of the filament-forming material through the hollow tips 100. The continuous filaments 54 are gathered into a linear group, bundle or sliver which is twisted under the influence of rotation of the rotor.

FIGURE 8 illustrates a rotor construction provided with guide means or projections adjacent the material discharge outlets or orifices. When a rotor operates at high speed there is a tendency for the cone of glass material at an orifice to be thrown off by centrifugal forces. The arrangement shown in FIGURE 8 reduces or lessens the tendency of the cones at the orifices to be thrown from the rotor.

The rotor construction shown in FIGURE 8 includes a cylindrical member 104 having an imperforate bottom wall 105, the rotor adapted to receive the stream 20 of glass or other filament-forming material in flowable condition. Circumferentially spaced around the lower region of the wall 104 are orifices 107.

Disposed in each of the orifices 107 is a member 108 having a tapered shank or body portion 109, the inner end of each of the shank portions 109 being formed with two or more projecting ears 110 as shown in FIGURE 9. The end regions 112 of the ear portions 110 may be welded or otherwise secured to the inner surface of the cylindrical rotor 104. The shank portion 109 is centrally disposed in an orifice so that the glass completely surrounds the shank portion as it flows outwardly along said portion as shown at 114 in FIGURE 8.

In this manner the glass flows outwardly in generally cone-shaped configurations as indicated at 114 toward the apices 115 of the shank portions 109 and from which continuous filaments 54 are attenuated by winding the group of filaments upon a sleeve in the manner illustrated in FIGURE 1.

By providing a tapered projection 109 supporting the flowable glass as it moves toward the tip or apex 115, a thin film of glass surrounding the projection 109 flows along the projection and is attenuated to a continuous filament. The members 108 may be formed of metals such as platinum rhodium capable of withstanding the high temperature of the molten glass. The use of projections 109 also tend to minimize flooding of the glass through the orifices.

FIGURE 10 is illustrative of another form of guide means or tip for conducting glass or filament-forming material from a rotor. As shown in FIGURE 10, the rotor construction includes a cylindrically shaped wall 118 and a bottom wall 120. The lower region of the rotor wall 118 is provided with a plurality of circumferentially spaced orifices or openings 122, one of which is shown in FIGURE 10.

A guide member 124 which may be formed of heat resistant metal has a reduced portion 125 arranged in the opening or orifice 122 but occupying only a portion of the orifice, the projection having a head portion 126 which is welded or otherwise fixedly secured to the rotor wall 118. In this form of guide means, the lower surface of member 124 is curved downwardly as shown at 128 and the glass or other filament-forming material passing through the orifice 122 flows along the curved surface 128 as indicated at 130.

The functioning of the projections 124 is substantially the same as the projections 109. The glass moves through an orifice 122 and as the same flows along the curved surface 128, the film or cone of glass is thinned out. The thinning of the cone of glass from an orifice influenced by the downward curvature of the surface 128 prevents the cone of glass from being disengaged from the rotor under the influence of the centrifugal forces. Furthermore the arrangement shown in FIGURE 10 tends to minimize flooding of the glass through the orifices.

FIGURE 11 illustrates a modified form of rotor or spinner construction wherein several vertically spaced rows of circumferentially spaced material discharge orifices are provided arranged so that the continuous filaments formed from material extruded through the orifices do not interfere with one another or impair the collection of the filaments. The rotor is inclusive of a cylindrically shaped wall 133 joined with an imperforate bottom wall 134, the upper portion of the rotor being formed with a restricted cylindrical portion 135 of lesser diameter than the wall 133 and which is joined to the latter by means of a flange 136.

The flange 136 serves as a baffle to confine the filament-forming material of the stream 20 within the cylindrical portion 133 for discharge through suitable orifice means. As shown in FIGURE 11, there is provided a plurality of rows of hollow tips, tubular members or bushings in which the extremities of the tips of a row project at a greater radial distance from the axis of the rotor than extremities of the tips of the next lowest row of tips.

The tips or tubular members of the several rows illustrated are designated respectively 138, 139, 140 and 141. In such manner the continuous filaments 54 formed from filament-forming material extruded through the hollow tips or bushings will be disposed in spaced relation in the region adjacent their discharge from the rotor. It is to be understood that the continuous filaments 54 may be gathered together and twisted by the rotation of the rotor to form a twisted sliver or they may be collected in any other suitable manner.

The arrangement shown in FIGURE 11 provides for the simultaneous attenuation of a large number of filaments from a single rotor and a high yield may be obtained without interference among the several filaments moving downwardly from the rotor construction. The coils 144 of an induction heater 145 are illustrated as disposed adjacent the region of delivery of the filament-forming material from the tips or hollow tubes 138, 139, 140 and 141. The induction heater 145 may be energized by electrical energy whereby heat is induced in the rotor and filament-forming material within the rotor maintained at the proper viscosity for efficient attenuation. In this form of rotor construction, the hollow tips or tubular members through which the filament-forming material is delivered from the rotor are horizontally arranged so that centrifugal force acting upon the filament-forming material within the rotor is effective to assist in the projection or delivery of the material through the tips or tubular members augmenting the mechanical attenuating means provided by rotation of a sliver collecting sleeve of the character shown at 59 in FIGURE 1.

FIGURE 12 illustrates a modified form of rotor construction shaped to provide successive rows of material discharge outlets or orifices wherein the continuous filaments from the rows of discharge outlets do not interfere with one another as the filaments are attenuated. The arrangement shown in FIGURE 12 includes a rotor having a cylindrical shaft portion 148 joined by means of an outwardly extending flange or ledge portion 150 which is joined with a frusto-conically shaped wall 152 tapered inwardly and downwardly which is joined with an imperforate bottom wall 154.

As shown in FIGURE 12, the wall 152 is formed with rows of outlets or orifices 154 and 155, the rows being spaced along the tapered wall 152 so that the continuous filaments 54 formed from the filament-forming material contained in the rotor move downwardly without interference. The regions of the wall 152 adjacent each of the orifices in the rows 154 and 155 are preferably formed with shoulders 157 to minimize or avoid flooding.

The stream of molten glass 20 is introduced through the shaft or cylindrical portion 148 of the rotor and, under the influence of centrifugal forces of rotation, the glass flows outwardly to the position indicated at 158 providing a supply of glass adjacent the rows of orifices 154 and 155. The glass is confined along the inner surface of the wall portion 158 by the inwardly extending ledge provided by the flange 150. The material in the rotor may be maintained at proper temperature and viscosity by means of an induction heater such as that shown at 145 in FIGURE 11 or by other suitable form of heating means.

FIGURE 13 is illustrative of a rotor shaped to discharge excess glass through an opening in the bottom wall and a starting means or filament directing arrangement for initiating continuous filament-forming operations. The rotor 160 illustrated includes a hollow cylinder or sleeve 162 having at its lower end an inwardly extending bottom wall or flange 163. A plurality of struts or elements 164 support a plate 165 which is positioned in the path of the glass stream 20 delivered into the rotor.

The glass from the stream 20 impinging upon the member or plate 165 moves outwardly under the influence of centrifugal forces of rotation and accumulates along the inner surface of the cylindrical member of rotor 160 at the lower end region of the rotor, the glass being confined within the rotor by means of an annular disk or baffle 167 welded or otherwise secured to the cylinder 162. In the rotor wall 162 in the region between the flange 163 and the baffle 167 is a plurality of rows of openings or orifices 169 through which glass is delivered from the rotor.

An induction heater or other type of heating means 170 may be disposed adjacent the rotor 162 for controlling and maintaining the proper temperature and viscosity of the glass or material within the rotor so that efficient attenuation may be attained.

Surrounding the region of the rotor formed with the orifices 169 is a bonnet or hood 172, the bonnet having a curved upper surface 173 which terminates adjacent the induction heater 170, the bonnet or hood 172 embracing or enclosing the filament attenuating region.

Air or other gas may be delivered into the hood 172 adjacent the inner surface thereof in order to assist in starting the filament-forming operations by directing the filaments so that they may be gathered into a sliver. The bonnet 172 is provided with tubes or ducts 175 arranged to be connected with a source of air, steam or other gas under pressure which is directed downwardly along the inner surface of the wall or bonnet 172 to entrain the filaments and carry them downwardly where they are gathered into a group and directed onto a collector as, for example, in the manner illustrated in FIGURE 1.

In the event that an oversupply of glass temporarily occurs in the rotor, the excess may flow out of the rotor through the opening 166 in the bottom wall or flange 163. The table or plate 165 is of greater diameter than that of the opening 166 and under normal operating conditions, the glass is directed laterally by the plate 165 and accumulates in the region adjacent the outlets 169 under the influence of centrifugal forces.

FIGURE 14 illustrates a form of rotor and arrangement for heating the filament-forming material during its traverse into the rotor and applying heat to the material after its delivery into the rotor. The rotor construction 178 is inclusive of a cylindrically shaped wall 179, an imperforate bottom wall 180 which is joined with the wall 179 by means of an angular or frusto-conically shaped wall 181. The wall 181 is formed with rows of orifices 183 through which the glass is discharged for attenuation into continuous filaments. The rotor construction 178 is supported by a hollow shaft 185 mounted in suitable bearings and rotated by driving means (not shown).

Extending into the shaft 185 and the rotor 178 axially thereof is a tube or duct 187 through which the glass 20 is delivered into the rotor. Surrounding the tube 187 and preferably concentric therewith is a sleeve 188 within which is positioned an induction heater 190 which is adapted to be connected with a source of electrical energy. The induction heater 190 functions to maintain the glass in the tube 187 in a flowable condition. A jacket 194 is disposed adjacent the sleeve 188 and surrounding the same in order to minimize loss of the heat energy developed by the induction heater 190.

Disposed adjacent the cylindrical wall 179 of the rotor is an induction heater 196 in the form of a series of coils adapted to be electrically energized through conductors 197 connected with a current supply. The induction heater 196 serves to maintain the glass or filament-forming material within the rotor at the proper viscosity for efficient attenuation.

A baffle member 199 extends both inwardly and outwardly of the cylindrically shaped portion 179 of the rotor, the inwardly extending portion serving to limit the upward movement of glass within the rotor under the influence of centrifugal forces, while the outwardly or laterally extending portion forms a baffle to restrict air circulation around the heated region of the rotor.

The rotor 185 may be rotated by any suitable means. For example, the motor arrangement shown in FIGURE 1 may be utilized for the purpose. For example, high speed air turbine means may be employed for rotating the rotor 185 as well as the other forms of rotor shown in the drawings. The continuous filaments 54 attenuated from the material flowing through the orifices 183 may be gathered together into a sliver which is twisted by the rotation of the rotor, the twisted sliver being collected in any suitable manner.

FIGURE 15 illustrates an arrangement wherein a gas stream or high velocity gaseous blast may be utilized to assist in starting the filament-forming operation and for assisting in attenuating fiber-forming material to continuous filaments. The rotor construction 200 shown in FIGURE 15 is inclusive of a shaft portion 202 provided with a flange 203 to which is secured a rotor 204.

The rotor is formed with a bottom wall 205 and a substantially cylindrical wall portion 207 provided with one or more rows of circumferentially spaced hollow tips 206 through which filament-forming material is discharged. The rotor is rotated at high speed by driving means (not shown) associated with the shaft 202.

This arrangement includes means for directing an annularly shaped stream or blast of gas into engagement within the continuous filaments to aid in starting the filament-forming operation and to assist in attenuating the material into continuous filaments. The arrangement includes an annularly shaped member 210 which is formed with an annularly shaped manifold chamber or zone 212 which may be lined with refractory.

The bottom wall of member 210 is configurated with an annular restricted orifice 214 or discharge outlet in communication with the chamber 212 adapted or arranged to direct an annular blast or stream of gas into engagement with and in the general direction of movement of the contniuous filaments 54 being attenuated from material projected outwardly from the rotor through the hollow tips 206. The gas utilized for the purpose may be steam, air or other suitable gas which is admitted under pressure into the chamber or manifold 212 through one or more inlet tubes 216. If desired, a combustible mixture may be introduced into the chamber 212 and burned within the chamber, the products of combustion being projected through the annular orifice 214 into contact with the continuous filaments 54. It is to be understood that the blast producing arrangement shown in FIGURE 15 may be utilized with other types of rotor construction disclosed herein where the orifices in the rotor are arranged so as to project the filament-forming material laterally of the axis of rotation of the rotor.

In carrying out the method of the invention through the utilization of the rotor arrangements disclosed herein, it is desirable to apply a lubricant, size, binder or other coating material onto the newly formed continuous filaments to minimize interabrasion of the filaments or to aid in retaining the filaments in a sliver, thread or yarn formation.

FIGURE 16 illustrates a form of means for applying a lubricant, binder or other coating material onto the sliver of continuous filaments adjacent the region at which they are gathered into a sliver or group formation.

As illustrated in FIGURE 16, the rotor 218 is formed with a vertically disposed cylindrical wall 220 provided with orifices or hollow tips 222 through which the filament-forming material 12' within the rotor is projected and the projected bodies attenuated to continuous filaments by being wound upon a sleeve or collet 224. The rotor 218 is formed with a hollow shaft portion 225 which is rotated by suitable means and which is joined with the vertical wall portion 220 by a frusto-conically shaped surface 226. The glass stream 20 is introduced into the rotor through the hollow shaft portion 225.

An applicator member 227, preferably disposed adjacent the region of the juncture of the filaments into a sliver or bundle, is arranged to be engaged by the sliver of continuous filaments. The member 227 may be a felt pad, a graphite pad or a rotatable roller to which a binder, lubricant or other coating material is delivered from a supply by means of a tube 229. A valve 230 is provided for regulating the rate of delivery of coating material to the applicator 227. The sliver or group of continuous filaments acquires the coating material by the wiping action effected through contact with the applicator 227.

The filament coating means shown in FIGURE 16 may be employed for coating filaments formed from other rotor constructions illustrated in the drawings, the particular coating applied to the filaments depending upon the purpose for which the same are to be utilized.

FIGURE 17 illustrates another form of rotor construction and a modified arrangement for applying a lubricant, binder or other coating material onto the sliver or group of continuous filaments. The rotor 234 is of hollow configuration having a vertically arranged cylindrical wall 235 provided with orifices or hollow tips 236 through which the glass or other filament-forming material 12' within the rotor is discharged under the influence of centrifugal forces set up by rotation of the rotor. The rotor is inclusive of a hollow shaft portion 237 which is joined to the vertical peripheral wall 235 by a frusto-conically shaped surface 238.

The bottom wall of the rotor is inclusive of a downwardly inclined inwardly extending frusto-conical wall portion 239 joined with an upwardly and inwardly extending frusto-conical wall portion 240. The heat-softened glass or other filament-forming material is delivered through the hollow shaft portion 237 into the annular trough 241 provided by the convergence of the frusto-conically shaped surfaces 239 and 240. The upper edge region of the surface 240 defines an opening 243 through which extends a tubular member or pipe 244, the lower end 245 of which is disposed adjacent the juncture of the continuous filaments 54 at which region they are twisted by the rotation of the rotor. The group of twisted filaments 56 may be collected by winding same upon a rotating collet or sleeve 224'.

The stream of glass 20 is directed into the hollow rotor out of alignment with the axis of rotation in order that the glass may be diverted by the conically-shaped wall 240 into the annular trough-like configuration 241.

The tube 244 is connected with a supply of lubricant, binder or other coating material which is delivered onto the continuous filaments 54.

FIGURE 18 is illustrative of a modified form of rotor construction and shows another method and arrangement for delivering lubricant, binder or other coating material onto the continuous filaments 54. In this arrangement a rotor 248 is provided with a cylindrical wall 249 provided with orifices or hollow tips 250 through which softened glass 12' within the rotor is projected and attenuated to continuous filaments 54 in the manner hereinbefore explained which are twisted together to form a twisted sliver or filament group 56 by rotation of the rotor.

The rotor is fashioned with a hollow shaft portion 252 joined by a frusto-conically shaped surface 253 with the circular peripheral surface 249. The bottom wall 255 of the rotor is joined with a centrally arranged upwardly extending cone-shaped portion 256. The upper edge region of the portion 256 defines an opening 257 through which extends a tubular member or pipe 259 equipped at its lower end with a spray nozzle or applicator 260. The tube 259 is connected with a reservoir or source or supply of lubricant, binder or other coating material. The filament coating material may be delivered by the nozzle 260 under air or gas pressure and thereby atomized to form small particles or globules which readily collect upon or cling to the continuous filaments 54.

In the method performed by the arrangement shown in FIGURE 18, the lubricant, binder or coating material is delivered onto the continuous filaments while they are still in an isolated state so that they become adequately and completely coated before or concomitantly with their formation into a twisted sliver or group, the twist being imparted to the sliver or group through the rotation of the rotor.

The stream 20 of glass or other filament-forming material is delivered through the hollow shaft portion 252 at a region spaced from the axis of the rotor and from the opening 257 in order that the material will not pass through the opening but is directed outwardly into contact with the inner surface of the peripheral wall 249 by centrifugal forces providing an ample supply of the filament-forming material at the wall 249.

FIGURE 19 is illustrative of another method and arrangement for delivering lubricant, binder or other coating material onto the continuous filaments 54. The rotor 264 which is of hollow construction is formed with a circular cylindrical wall 265 provided with orifices or hollow tips 266 through which the filament-forming material 12' within the rotor is projected by centrifugal forces of rotation. The rotor is fashioned with a hollow shaft portion 267 which is joined with the circular peripheral wall 265 by a frusto-conically shaped wall portion 268. The bottom wall 269 of the rotor extends downwardly and inwardly and joins an upwardly projecting sleeve-like portion 270. The stream 20 of glass is delivered through the hollow shaft portion 267 into an annular trough-like configuration 271 provided by the bottom wall 269 and the upwardly extending sleeve portion 270.

The sleeve 270 is of a diameter defining a passage 272 through which extends a rod, shaft or tube 273 equipped at its lower terminus with a spherically shaped member or ball 275.

The shaft 273 and ball member 275 may be rotated with the rotor 264 or independently thereof. The lubricant, binder or other coating material conveyed from a supply by pipes 278 is delivered from applicators or nozzles 277, preferably in the form of a spray directed toward the peripheral surface of the ball 275. The continuous filaments receive coating material from the spray and also contact the surface of the ball 275 and wipe coating material from the ball whereby the individual filaments are completely coated adjacent the region at which they are gathered into a sliver or group 56 and a twist imparted thereto through the rotation of the rotor 264.

The sliver of filament group 56 is directed to a rotating collet or sleeve similar to the sleeve 224' upon which the twisted sliver is wound, the winding attenuating the glass into continuous filaments 54. While two applicators 277 are illustrated in FIGURE 19, it is to be understood that any number of applicators may be utilized if desired.

FIGURE 20 illustrates another method and arrangement for delivering lubricant, binder or coating material onto the continuous filaments or fibers which is usable with the forms of rotor provided with a central opening to accommodate a tube for the coating material to be applied to the filaments. The arrangement includes a tube 280 which is provided at its lower extremity with a circular disk, table or platform 282. The wall of the tube 280 adjacent the upper surface 283 of the platform 282 is formed with a plurality of orifices 284, one of which is shown in FIGURE 20.

The lubricant, binder or coating materials flows from a source of supply through the tube 280, and through the openings or outlets 284 onto the surface 283 of the platform. The tube 280 extends through an opening formed in the central region of a bottom wall of a rotor with which the arrangement may be used and is connected with a supply of coating material to be applied to the continuous filaments 54.

Surrounding the table or platform 282 is an annular member 285 formed with an inner upwardly extending flange 286 providing an annular trough or chamber 288 for collecting excess binder which flows over the peripheral surface of the table 282 and is conveyed away by means of a tube 289 for reuse. The filaments 54 during their downward travel wipe the coating material from the edge surface of the disk or table 282 and thereby acquire a film of the coating material. Coating material which does not adhere to the filaments passes into the trough 288.

The disk or table 282 is of a diameter such that all of the continuous filaments 54 brush against or contact the coating on the peripheral surface of the disk or table so that each filament acquires a coating of material. The coated filaments are joined in a group or sliver 56 which is twisted under the influence of rotation of the rotor from which the filaments are attenuated as in the arrangements hereinbefore described.

The disk or platform 282 is preferably formed of graphite, rubber or the like to minimize wear of the edge region of the disk. If the coating material is of a comparatively high viscosity, the continuous filaments 54 may acquire a film of the coating material without contact with the disk.

FIGURES 21 and 22 illustrate an arrangement for collecting continuous filaments directly from a rotor into a circular mass, pack or mat formation. As particularly shown in FIGURE 21, a rotor 295 mounted upon the lower end of a tubular shaft portion 297 is formed with a vertically arranged circular wall 298 provided with orifices or hollow tips 300 through which glass or other filament-forming material 12' within the rotor is projected by centrifugal forces. The rotor 295 is rotated at sufficient speed whereby centrifugal forces are created of a magnitude sufficient to project the material outwardly, the rotation of the rotor effecting attenuation of the centrifuged material into fine continuous filaments.

The arrangement includes a filament collecting means spaced from and circumferentially disposed around the rotor and preferably concentric with the axis of the rotor. The collecting means is of a character adapted to travel longitudinally in a direction parallel with the axis of the rotor and arranged to receive or collect the continuous filaments in a manner forming a cylindrically shaped body or mat of the filaments.

Arranged in a circular pattern about the axis of the rotor 295 is a plurality of rollers 302, each roller being supported upon a comparatively short shaft 304, the shafts being mounted in bearings (not shown) and being angularly arranged one with respect to another and joined together at their abutting regions by means of universal joints or flexible connections 305 of conventional construction. The series of connected rollers 302 is driven by suitable means (not shown).

Each of the rollers 302 supports an endless type belt of chain 308, the inner flights 310 of which provide a generally cylindrical surface region against which the continuous filaments 54 are delivered under the influence of centrifugal forces developed by the rotation of the rotor.

A second series of rollers 312 of the same size and disposed in a generally circumferential arrangement about the axis of the rotor provides support for the lower regions of the endless belts 308 in the manner shown in FIGURE 21. Each of the rollers 312 is mounted upon a comparatively short shaft 315, the shafts being identical with the shafts 304 which support the rollers 302 of the upper series. The end regions of the shafts 315 are preferably connected together by means of universal or flexible joints similar to the connections 305 which join the shafts 304 into a continuous power transmitting component.

Each of the rollers 312 is disposed immediately beneath and in vertical alignment with an adjacent roll 302 in the upper series so that each filament supporting flight 310 moves in a plane or path generally parallel to the axis of rotation of the rotor 295.

Disposed between the flights of each of the endless belts or chains 308 is an elongated receptacle 317 forming a chamber 319, the chambers 319 being connected together by tubular means or pipes 320 and with a main pipe (not shown) connected with a suction blower or means for establishing a zone of suction or reduced pressure effective at the regions of the flights 310 of the endless belts 308 to assist in collecting and retaining the continuous filaments 54 on the inner surfaces of the flights 310.

The endless belts 308 are driven in a direction whereby the inner flights 310 of the belts move away from the rotor which, in the embodiment illustrated in FIGURE 21, is in a downward direction. The continuous filaments are collected into a mass, pack or mat 322 which, as it moves downwardly, is held in engagement with the flights 310 by the reduced pressure in the adjacent chambers 319.

Means is provided for delivering lubricant, binder or coating material onto the continuous filaments as they are being collected upon the flights 310 of the supporting and collecting means. As shown in FIGURE 21, applicators 324 are disposed so as to direct a binder or coating material onto the filaments concomitantly with their deposition on the filament collecting belts.

The applicators 324 are connected by tubes or pipes 326 with a reservoir or supply of binder or coating material. If the coating material applied to the filaments is of the air drying type, the movement of air through the mass or mat 322 of collected filaments into the suction chambers 319 serves to set the binder so as to provide a degree of mass integrity in the mat of continuous filaments.

The mat of filaments is of hollow cylindrical formation as it leaves the flights 310 of the filament collecting conveyor means. The cylindrically shaped mat 322 may be severed into one or more strips depending upon the number of severing devices employed in splitting the mat.

As shown in FIGURE 21, there is mounted upon a supporting plate 326 a backing roller 328 and a mat severing means or knife 330 which is preferably a circular knife. As the zone of the mat 322 moves adjacent the backing roll 328, the mat is engaged by the cutting knife 330 and severed into a single strip. By using additional severing devices the cylindrically shaped pack or mat may be severed into several strips or individual mats.

It is to be understood that the travelling components of the filament-collecting arrangement illustrated in FIGURE 21 may be fashioned of flexible mesh metallic material, a rubber tread caterpillar arrangement or a series of flexible cables or ropes supported by groups of sheaves or pulleys. The thickness and density of the mass, pack or mat 322 formed of the continuous filaments 54 may be varied and controlled by varying the amount of glass or filament-forming material delivered from the rotor 295 and by varying the rate of travel of the filament collecting supporting means provided by the flights 310.

Products or mats made from the assemblage of continuous filaments 54 are especially adapted as reinforcement for plastics and other uses wherein a continuous filament mat having high strength characteristics in all directions is desired.

FIGURES 23 through 25 illustrate an arrangement and method for forming a reinforced mat of continuous filaments. The apparatus for forming continuous filaments 54 and collecting the filaments as shown in FIGURE 23 is the same as the arrangement shown in FIGURE 21. This apparatus includes an upper series of rollers 302' carried upon shafts 304' which are joined together by universal joints or flexible connections 305'.

A second series of rollers 312', each carried upon a separate shaft 315', is arranged whereby each pair of rollers 302', 312' supports an endless belt 308', the continuous filaments from the rotor 295' being collected upon the inner flights 310' of the endless belts or chains 308'. Suction chambers 319' are disposed adjacent each of the flights 310' in order to assist in the collection of the continuous filaments 54 into a mass. A suitable driving means (not shown) for the belts 310' is provided for moving the inner flights 310' of the belts in a direction away from the rotor as viewed in FIGURE 23.

The continuous filaments 54 are collected upon the conveyor flights or moving support 310' in the same manner as hereinbefore described in connection with FIGURE 21. The arrangement illustrated in FIGURE 23 is especially adapted for forming a mat of continuous filaments reinforced with strands, threads or yarns.

Arranged adjacent the filament collecting apparatus are spools or packages 335 of reinforcing yarns, strands or threads 337. A group of strands, threads or yarns or other reinforcing material is directed over the upper region of each of the endless belts 308' in the manner illustrated in FIGURE 24 thereby the threads, yarns or strands of all the groups move downwardly concomitantly with the downward movement of the inner flights 310'. The reinforcing strands, yarns or threads 337 are circumferentially spaced in the manner shown in FIGURE 24 and form parallel backing components upon which the continuous filaments 54 are deposited to form a reinforced mat, pack or mass 340.

A suitable binder of a character which will adhere the continuous filaments 54 to the reinforcing strands, threads or yarns 337 may be delivered by applicators 342 shown in FIGURE 23 which are arranged so as to direct or distribute binder onto the reinforcing material and onto the continuous filaments 54 during their collection and at the beginning of their downward movement by the conveyor flights 310'. If an air drying or air setting binder is utilized, the air movement through the assemblage of continuous filaments 54 and reinforcing strands 337 under the influence of the suction in the chambers 319 will set the binder to provide a degree of mass integrity in the mat structure. If a thermo-setting binder is employed, heated air may be directed through the assemblage of filaments and reinforcing material to cure or set the binder.

The incorporation of reinforcing strands, yarns or threads 337 in the mat of filaments 54 wherein the reinforcement is disposed longitudinally of the mat provides exceptionally high strength characteristics in a longitudinal direction. This product, therefore, is particularly usable where high strength characteristics lengthwise of a mat are desired.

The reinforced mat may be severed into one or more strips. FIGURE 25 illustrates diagrammatically the severing of the cylindrical mat structure 340 into strips or mats 342 and 344. Severing devices 346 are disposed in diametrically opposed relation and as the mat structure 340 moves away from the conveyor flights 310' the severing devices split the mat into the strips 342 and 344, the severed strips being formed into packages or rolls 348. The mat structure 340 may be severed into any number of strips by utilization of a requisite number of severing devices 346.

FIGURES 1, 11, 13 and 14 diagrammatically illustrate electrical induction means for heating the rotor or components associated with the rotor for effecting control of the temperature of the spinner or rotor so as to maintain the glass or other heat-softened fiber or filament forming material in the rotor in a flowable condition. Heretofore, it has been a practice to deliver heat-softened glass or other molten material into a rotor or spinner at a very low viscosity or highly fluid condition at a comparatively high temperature so that heat from the glass maintains the spinner at a temperature sufficient to avoid "freezing" or congealing of the glass in the rotor.

Through the use of electric induction heating or other heating means, the rotor may be heated to the required temperature to maintain the glass in the proper state of flowability or viscosity for its discharge through the orifices in the rotor wall without extracting appreciable heat from the glass in the rotor. Thus with this method of heating the rotor, the glass may be delivered from the supply feeder at a lower temperature and more accurate control maintained of the viscosity of the glass in the rotor.

Other arrangements of translating electrical energy into heat for heating the rotor may be utilized. Current supplied to a plurality of field coil and core assemblies disposed around the rotating spinner or rotor set up eddy currents or currents developed by hysteresis causing heating of the rotor to the temperature desired.

A current of electrical energy may be passed directly through the rotor through the use of slip rings and the rotor heated by resistance to the passage of current. Another operative arrangement may be employed wherein the rotating spinner or rotor cuts the magnetic flux of one or more electromagnetic fields to effect a heating of the rotor to the desired temperature. Temperature control may be exercised by varying the current flow though the field coils or by other means for varying the power input. This control may be supplemented or augmented by varying the temperature of the glass or other molten delivered into the rotor.

Capacitance heating may also be employed by disposing capacitor plates in juxtaposition with the rotor to effect a heating of the rotor. Capacitance heating of the glass stream by means of capacitor plates disposed along the path of flow of the glass stream into the rotor may be utilized for obtaining the desired temperature of the glass stream.

An arrangement of rotor construction in combination with a coating applicator of the character shown in FIGURE 20 may be utilized for imparting curl configurations to the continuous filaments. A disk, preferably of graphite, similar to the disk 282 shown in FIGURE 20 and of a diameter greater than the diameter of the rotor, may be disposed adjacent and beneath the rotor so that the continuous filaments, drawn from the material flowing through the rotor orifices, contact and are bent around the periphery of the graphite disk and a substantial curl imparted to each of the filaments.

The graphite disk is disposed so that the filaments, while substantially completely attenuated at the time they engage the periphery of the disk, are of a temperature at which they are thermoplastic to the extent that secondary stretching or attenuation may be accomplished whereby the region of a filament opposite its zone of engagement with the periphery of the graphite disk is stretched or elongated relative to that region in contact with the disk. The inner region of each filament contacting and being bent around the curvilinear edge of the disk is cooled rapidly by transfer of heat from the filament to the disk so that a permanent curl is formed in each filament.

The filaments wipe the coating material, sizing or lubricant, from the periphery of the disk in substantially the same manner as shown in FIGURE 20. Furthermore, the graphite disk utilized to impart a curl to the filaments is cooled by the continuous flow of coating material onto the disk. In the formation of curly filaments or fibers in this manner the graphite disk is rotated with the rotor.

It is essential in the utilization of this method of forming curly fibers to employ a disk adjacent the rotor of a diameter greater than that of the rotor in order to effect an abrupt change in the direction of movement of each filament by bending it around the curvilinear periphery of the disk. The rapid cooling of the inner region of each filament concomitantly with the further stretching of the outer region resulting from the bending of the filament establishes a permanent continuous curl in the filaments.

The invention is inclusive of a method of and apparatus for forming composite linear products by assembling, combining, wrapping or winding continuous filaments of heat-softened material, as they are formed, with or upon core structures of various types and fashioned of various materials to produce novel products for many and diverse uses. FIGURE 26 is illustrative of one form of apparatus for assembling or winding continuous filaments upon a linear metallic body to form an insulated cable or conductor suitable for the transmission of electric energy.

The arrangement includes a thin-walled hollow rotor 400 which is adapted to be rotated by means of an electrically energizable motor of the character shown at 33 in FIGURE 1 or other suitable means, the rotor 400 being journaled upon a supporting frame (not shown). The rotor is fashioned with a hollow tubular shaft portion 402 through which a stream of heat-softened mineral material 404, such as glass, is delivered or flowed from a forehearth or feeder such as that shown in FIGURE 1. The glass 404 of the stream within the rotatable rotor is subjected to centrifugal forces of rotation of the rotor 400 and is thereby delivered to the interior surface of a peripheral wall 406 forming a film 408.

The peripheral wall or circular band 406 of the rotor 400 is provided with a plurality of transversely spaced orifices 408 arranged in rows through which the heat-softened glass flows under the influence of centrifugal forces to form fine continuous filaments 54. The floor 410 of the rotor is provided with an upwardly extending hollow region 412, the wall of which directs the glass away from the central region of the rotor.

The upper terminus of the wall 412 defines a circular opening 414 which provides a vent for the escape of gases from the hot glass and accommodates guide means for delivering a core structure axially through the rotor. Disposed within the rotor and extending through the hollow shaft portion 402 and through the opening 414 is a guide means or conductor 418 of tubular configuration for guiding or directing a core or core structure 420 to a winding region or station 422 at which the newly formed continuous filaments are caused to be wound about the core structure 420 under the influence of the rotation of the rotor 400.

In this form, the core structure 420 may be a metallic member, wire or cable, which is unwound from a supply roll 424 supported in any suitable manner, the cable or wire 420 passing over a guide roller 426 or other suitable means for facilitating delivery of the wire or cable 420 through the tubular guide 418. The product 430 formed through the method and apparatus comprises the core structure 420 embraced within, covered or sheathed with the newly formed continuous filaments 54 of glass or other heat-softened material.

It is preferable to deliver or apply a binder or coating material onto the assemblage 430 to assist in stabilizing the covering of filaments as well as to effect adhesion between the core structure 420 and the filaments.

Binder or coating material may be applied by an applicator or shoe 432 disposed beneath the region at which the filaments are wound, collected or assembled on the core. The applicator may be supplied with flowable binder or coating material 434 delivered from a supply to the applicator through a tube 436 or other suitable means.

The end product 430 comprising the filament-embraced core may be wound upon a rotatable collector or sleeve 438 mounted upon a mandrel or arbor 440 rotated at a desired speed dependent upon the nature of the orientation of the continuous filaments on the core. If a comparatively thick component or layer of filaments is desired for the core, the product 430 is advanced at a comparatively slow speed to effect a concentration of the filaments.

The sheath provided by the filaments may be made of desired thickness by controlling the rate of winding the product 430 upon the sleeve 438 which determines the rate of advancement of the core 420 to the filament winding or applying region 422. If a comparatively thin insulating sheath of filaments is desired on the core, the product 430 is advanced at an increased rate of speed. Any suitable means such as a motor (not shown) may be employed for rotating or driving the arbor 440 carrying the package collector 438, the driving arrangement embodying conventional means for compensating for the build up or progressive increase in size of the product package 442 to maintain a controlled linear speed of the product 430 and the core 420.

The speed of the rotor 400 may be varied not only to modify the size of the continuous filaments being formed but also the character of the winding pattern of the filaments on the core. The temperature of the glass being extruded through the orifices in the rotor may be modified or controlled to change the viscosity of the glass and hence change the character of the continuous filaments.

The number of individual filaments from the rotor may be varied and this factor influences the character of the winding on the core. By adjusting or regulating one or more of the above mentioned factors, a wire, cable, rod or core of any suitable material may be provided with a uniform closely controlled winding, cover or shroud of continuous filaments to best serve a particular purpose or end use.

The composite product 430 or filament coated core may be provided with a coating of paint and, if desired, the product 430 may be passed through or immersed in a binder or other material if more thorough impregnation is desired. As shown in FIGURE 26a, a spray gun or applicator 444 may be employed to deliver paint or other coating material at the region 422 at which the filaments are being wound upon the core 420. If thorough impregnation is desired, the product 430 may be passed around a roll 446 immersed in impregnant 448 contained in a receptacle 450, the impregnated produce passing over a guide roll 452 for winding upon a sleeve or collector such as that shown at 438 in FIGURE 26.

Thus, before the filament-wound core is packaged, it may be treated by the methods above mentioned with binders, sealers, overcoating, painting and the like applied by wiping contact, spraying, dipping or immersion. The method of the invention may be advantageously employed for applying continuous filament sheath to flexible nonmetallic hose or the like for imparting high strength reinforcement to the hose as the linear coefficient of strength of glass filaments is comparatively high.

This characteristic of glass filaments and the method of application facilitates the fabrication of a hose structure capable of carrying liquids or gases under substantial pressure wherein the cross sectional structure of the hose may be reduced to a minimum by reason of the use of high strength glass filaments. A core 420 of hose fabricated of flexible material may be advanced through the rotor at a linear speed sufficient to prevent heat damage to the hose under the high temperature environment in the rotor.

FIGURE 27 illustrates a method and apparatus similar to FIGURE 26 which includes a hollow rotor 400a and a guide means or tube 418a extending through the opening in the central region of the rotor. The molten glass or other heat-softened material within the rotor is projected through the orifices 408a providing streams which are attenuated to filaments 54, the filaments being converged at the region 422a.

A core or linear body 420a may be advanced through the guide means 418a comprising a plurality of yarns or rovings 456 from supply rolls 458 supported upon a suitable creel (not shown) or other supporting means. The yarns or rovings 456 are converged by a gathering means such as a grooved roll 460 to form the core or linear body 420a which is continuously advanced through the guide tube 418a into contact with the filaments 54 at the region of convergence of the filaments at 422a.

The filaments are twisted about or embrace the core 420a to form a coating of continuous filaments on the core. The composite product 462 comprising the core surrounded by the continuous filaments is wound upon a collector sleeve 438a mounted upon a rotatable mandrel 440a which is rotated at a controlled speed. The collection of the composite product in this manner continuously advances the core 420a as the continuous filaments are wound thereon under the influence of rotation of the rotor. An applicator 432a may be provided for applying binder or adhesive 434a or other coating material to the composite product 462, the binder being supplied through a duct 436a.

It is to be understood that other means of applying a coating, binder, adhesive or other material onto the continuous filaments and core may be employed. The composite product 462 made according to this method has substantial bulk, improved strength, a high degree of resistance to abrasion and is endowed with a high degree of yield or stretch in a direction linearly of the product. If desired, a coating or adhesive material may be applied to the core structure 420a before it is delivered to the region of convergence 422a with the filaments 54.

FIGURE 28 illustrates a method and apparatus for combining or merging short length bundles or strands of fibers or filaments with newly formed continuous filaments. In the form shown in FIGURE 28, the rotor 400b is of the same character as the rotor 400 shown in FIGURE 26 and a stream of glass 404b is delivered into the hollow rotor. Under the influence of centrifugal rotation of the rotor, the heat-softened glass is projected through orifices 408b as streams which are attenuated to continuous filaments 54 converging at a region 422b.

Extending through the central opening in the rotor is a guide or material delivery tube 466 formed at its upper end with a tubular portion 468 in communication with a housing 470. Journally supported within the housing 470 are rotatable strand chopping or severing members 472. A strand or sliver 474 of filaments or fibers is advanced to the strand severing or chopping members by a feed roll 476 cooperating with one of the rotatable strand severing means.

The strand severing devices sever or chop the strand or sliver into short length bundles 478 delivered into the tubular portion 468. Rotatable mounted within the portion 468 is a feed screw 480 driven by a motor 482 for advancing the chopped strands or bundles of filaments into the guide tube 466 extending through the central opening in the rotor. The chopped strands or bundles of fibers 478 may move by gravity through the vertically arranged guide tube 466 or, if desired, a current of air or other gas may be introduced through a tube 484 to assist in feeding the chopped strands or bundles of filaments 478 through the guide 466.

The chopped strands may be fed at a controlled rate by regulating the speed of rotation of the chopping devices 472 and the motor 482 actuating the feed screw 480. The chopped strands or bundles of filaments 478 are delivered into contact with or merged with the continuous filaments 54 at their region of convergence 422b to form a composite linear body or product 486. The product 486 may be collected in the manner shown in FIGURES 26 and 27 by winding the same upon a rotatable collector. A binder, adhesive or other coating material may be applied at or just above the region of convergence 422b to adhere the cut strands to the twisted continuous filaments.

The binder or other coating material may be applied by applicators 488 by spraying the binder or coating material onto the cut strands or bundles of filaments and continuous filaments. The cut strands or bundles of filaments are not completely enclosed within the twisted continuous filaments 54 but provide a product 486 in which the short length filaments of the cut strands project from the cord or product 486 imparting a fluffy appearance to the product. This product may be used as a resilient filler or for decorative purposes.

The average length of protrusion of the chopped strands or short length bundles of filaments from the composite product may be controlled by varying the length of the chopped strands and, in a measure, the number of protrusions of filaments of the cut strands may be controlled by varying the rate of feed of the cut strands thus modifying the tightness or thickness of the wrap of the continuous filaments 54. The bulk of the product 486 may be varied in this manner.

FIGURE 29 illustrates a method and apparatus for merging and combining materials in a viscous state such as plastic resins with newly formed continuous filaments. The arrangement comprises a hollow rotor 400c, of the same character as shown at 400 in FIGURE 26, into which a stream of glass or other heat-softened material 404c is delivered, which, under the influence of rotation of the rotor 400c is projected through orifices 408c as fine streams which are attenuated by rotation of the rotor to continuous filaments 54.

The filaments 54 are converged and twisted at the region 422c. Extending through the central opening in the hollow rotor is a guide means or tube 490 to which is connected a mixer or blender 492 of conventional character. The arrangement shown in FIGURE 29 is adaptable for combining such materials as foam rubber or foam resins with newly formed continuous filaments to form a cordage type product 500.

The flowable rubber or resin may be introduced into the mixer 492 through a tube 494 connected with a supply, and a catalyst for activating or foaming the rubber or plastic resin is introduced into the mixer 492 through a tube 496 connected with a supply of the catalyst.

The mixer 492 is of a character which blends or mixes the rubber or plastic with the catalyst and feeds the blend or mix through the guide or delivery tube 490 into contact with the converging continuous filaments 54. The foamed rubber or plastic 498 delivered from the guide means 490 is combined or merged with the continuous filaments 54 being twisted together at the region 422c.

The foam rubber or foam resin, combined with the continuous filaments, forms a cordage which is endowed with characteristics of high strength and extensibility. The composite product 500 comprising the foam rubber or resin 498 and the continuous filaments 54 may be collected in the manner shown in FIGURE 26 upon a rotatable collector or collected by other means.

FIGURE 30 illustrates a method and apparatus for combining continuous filaments with a resin to form a composite product where heat is employed to treat the resin. The arrangement shown in FIGURE 30 includes a hollow rotatable rotor 400d into which a stream of glass 404 or other heat-softened material is introduced and, under the influence of rotation of the rotor, the glass or other heat-softened material is projected as fine streams through orifices 408d which are attenuated by rotation of the rotor to form continuous filaments 54.

Extending through a central opening in the rotor 400d is a guide means or tube 502, one end terminating adjacent a region of convergence 422d of the continuous filaments, the other end being connected with a resin feeding means or pump 504, which may be of the conventional rotary type embodying rotatable impellers 505. The feed means 404 may be connected by an inlet pipe 506 with a supply of resin or other material. Surrounding a portion of the guide means or tube 502 is a heating means 508 preferably an electrically energizable coil arranged to condition the resin to maintain the same in a highly viscous flowable state.

The viscous resin is fed through the guide means 502 at a controlled rate depending upon the speed of operation of the pump 504. The resin, 510 delivered from the guide means 502, is merged with the continuous filaments 54 at their region of convergence 422d. This method forms a composite product 512 which may be advanced through a heat-curing oven or chemical treating zone to set or solidify the resin.

If desired, the product may be sprayed with a suitable coating material. The resin may be a thermoplastic resin, a heat-settable resin or a chemically settable resin depending upon the end use for the product. The bulk of the product 512 may be modified by varying the rate of delivery of the resin to the continuous filaments. The product formed by the foregoing method may be used as fishing line, or a plurality of the linear products 512 may be twisted or combined together to form rope usable as ship's cables, tow ropes, nonrustable guy wires or the like.

FIGURE 31 illustrates a method and arrangement wherein newly formed continuous filaments are combined or assembled with a linear body of newly formed attenuated discrete fibers of glass or other mineral material. The arrangement is inclusive of a rotatable rotor 422e into which is introduced a stream of glass 404 or other heat-softened material and, under the influence of centrifugal forces of rotation of the rotor, the glass is projected through orifices 408e forming fine streams which are attenuated by the forces of rotation to continuous filaments 54.

Disposed adjacent to but spaced from the rotor is a means or apparatus for attenuating streams of glass or other heat-softened material to discrete fibers, such arrangement including a feeder 516 from which flow streams of glass 517. Disposed beneath the feeder is a blower construction 518 arranged to project blasts of steam or other gas through blower slots 520. The steam or gaseous blasts move downwardly in a general direction of the streams 517 and engage the material of the streams to form discrete fibers 522 of varying lengths.

An adhesive or binder may be delivered onto the newly formed discrete fibers by means of a binder applicator 524. The discrete fibers 522 are collected upon the exterior periphery of a perforated rotating drum 526 to collect the fibers into a thin web or mat 528. The collection of the fibers is influenced or assisted by suction or reduced pressure provided in a conduit 530, the suction being effective at the peripheral region of the drum 526 between stationary vanes or walls 532 connected with the conduit 530.

The mat of fibers 528 is advanced through a fiber compacting means or unit 534 of conventional character, such as that shown in the patent to Lannan et al. 2,239,722, to compact the fibers of the web into a linear staple body or sliver 536. Extending through the central opening in the hollow rotor 422e is a stationary guide means or tube 538 to accommodate the sliver or fibrous body 536. The sliver 536 is passed over a guide roll 540 and through the tubular guide means 538 and is fed to the region of convergence 422e of the continuous filaments 54.

The continuous filaments 54 are wound around the staple sliver or body 36. The thickness of the layer of continuous filaments on the core comprising the staple sliver 536 may be controlled by the rate of collection of the composite product 542. The composite product or end product 542 may be collected in the manner illustrated in FIGURES 26 and 27, or by other suitable means. Where an integrated sliver is formed by the compacter 534 having good linear strength characteristics, the guide tube 538 is not essential to the satisfactory delivery of the sliver to the region of its assembly with the continuous filaments.

FIGURE 32 illustrates apparatus for combining newly formed fine discrete fibers of glass with newly formed continuous filaments of glass or mineral material and, if desired, may be combined with one or more continuous threads, yarns or strip materials such as foil. The arrangement comprises a rotatable rotor 422f into which a stream of glass 404 is delivered from a supply, the glass within the rotor being projected outwardly through orifices 408f under the influence of centrifugal forces, the streams being attenuated to continuous filaments 54.

Arranged adjacent the rotor is an apparatus for concomitantly forming fine discrete fibers of glass for assembly with the continuous filaments 54. Such apparatus includes a guide means 550 provided with feed rolls 552 which attenuate streams of glass flowed from a feeder into primary filaments 553. The guide means 550 directs the primary filaments 553 of glass into a blast of intensely hot gases projected from a confined combustion chamber 555 formed within a burner 556.

The burner chamber 555 is provided with a restricted orifice 558 through which the gases of combustion are projected at comparatively high velocities. The combustion chamber 555 of the burner 556 is supplied with a fuel and air mixture through an inlet pipe 559 and the mixture ignited and substantially completely burned within the combustion chamber 555. The heat of the intensely hot gases of combustion softens the extremities of the primary filaments 553 and the softened material is attenuated by the velocity of the gases of the blast into fine discrete fibers 560. The discrete fibers 560 are delivered into a funnel-shaped member 562 of a compacter 564.

The member 562 is rotatably supported in bearings 566 carried by a support 568. The funnel-shaped member 562 is rotated by suitable conventional means (not shown). The compacter 564 forms the discrete fibers 560 into a compact sliver or linear body 568 which may be delivered through a guide means or tube 570 into the region of convergence 422f of the continuous filaments 54. The sliver 568 is guided into the tube 570 by a guide roll 572. If the integrated sliver has good linear strength characteristics, the guide tube 570 is not essential to the successful delivery of the sliver into contact with the continuous filaments 54.

The continuous filaments 54 are wound around the sliver 568, the latter forming a core of the composite product 574. The product 574 may be collected upon a rotating collector in the manner illustrated in FIGURE 26.

The core structure may include additional linear or strip material 575 such as foil, paper or plastic fed from a supply roll 576 over a guide roll 577 into the funnel-shaped member 562 for assembly with the discrete fibers 560 in the core structure. A binder or coating material from a supply tube 578 may be delivered onto the material 575 by an applicator 579.

FIGURE 33 is illustrative of an arrangement for applying multiple layers of newly formed continuous filaments onto a core. The apparatus is inclusive of two or more continuous filament-forming units of the character illustrated at FIGURE 26, two units being illustrated in FIGURE 33 designated respectively 580 and 582. Each unit is inclusive of a rotatable hollow rotor 422g into which is delivered a stream of glass 404, the glass in the rotor being projected under the influence of centrifugal forces through orifices 408g to form continuous filaments 54.

A stationary guide means or guide tube 418g extends through the opening in the central region of the hollow rotor. A core 584 of linear shape, fashioned of any of the materials hereinabove mentioned, is advanced through the guide tube of the unit 580 and the continuous filaments 54 assembled therewith or wound about the core at the region of convergence 422g of the continuous filaments 54.

The core material may be drawn from a supply 586 and passed over a guide roll 587 to direct the core into the guide tube 418g of the unit 580. The composite product 586 formed by winding the filaments 54 around the core 584 by the unit 580 passes around a roll 590 and over a second roll 587' adjacent the filament forming unit 582.

The product 586, which comprises the core with a first winding of continuous filaments 54 thereon, is advanced through the guide tube 418g of the second filament-forming unit 582 and an additional layer of continuous filaments 54 from the second unit 582 is wound about the linear body or product 586. This method forms a product 592 which comprises the core 584 with two layers of continuous filaments wound thereon.

The end product 592 may be wound upon a collector such as that shown at 438 in FIGURE 26, or the product may be delivered to one or more additional continuous filament-forming units if one or more additional layers of continuous filaments on the core is desired. In the use of both units 580 and 582 illustrated in FIGURE 3, applicators 432g may be arranged to deliver binder or adhesive or other coating material from a supply through a supply tube 436g.

It is to be understood that the continuous filament-forming units of any of the types herein disclosed may be utilized for combining continuous filaments with core structures or other materials in the series arrangement illustrated in FIGURE 33.

From the foregoing it will be apparent that the principles of the invention may be employed to assemble, apply or twist newly formed continuous filaments with various types and kinds of core structure, or with viscous or mastic materials, fibrous cores of various types hereinbefore mentioned, or with cores of wire, cable, tubing or the like.

It is apparent that, within the scope of the invention, modifications and different arrangements may be made other than as herein disclosed, and the present disclosure is illustrative merely, the invention comprehending all variations thereof.

I claim:

1. The method of forming and processing continuous filaments of heat-softenable mineral material including the steps of feeding a stream of the heat-softened mineral material onto a surface formed with openings, rotating the surface, discharging the mineral material through the openings, attenuating the mineral material discharged through the openings into continuous filaments by centrifugal forces of rotation, continuously collecting the filaments upon a circular support moving in a direction lengthwise of the axis of the rotating surface, applying a coating material onto the filaments, feeding linear reinforcing material into engagement with the continuous filaments concomitantly with their collection, moving the assemblage of continuous filaments and reinforcing material along the circular support, and severing the assemblage lengthwise of its direction of movement.

2. Apparatus of the character disclosed, in combination, a rotor having a wall formed with a plurality of orifices, means for rotating the rotor, means for delivering heat-softened mineral material into the rotor whereby the material is discharged through the orifices in individual bodies, the individual bodies of mineral material being attenuated into continuous filaments by centrifugal forces established by rotation of the rotor, a surface adapted to collect the continuous filaments in a mass, said surface being movable in a direction lengthwise of the axis of the rotor, means for feeding linear reinforcing material into engagement with the continuous filaments, an applicator adapted to deliver coating material onto the filaments, and means for severing the collected mass of continuous filaments as it is moved away from the rotor by the collecting surface.

References Cited

UNITED STATES PATENTS

| | | | |
|---|---|---|---|
| 2,431,205 | 11/1947 | Slayter | 65—16 |
| 2,704,734 | 3/1955 | Draper et al. | 156—62.4 |
| 2,732,885 | 1/1956 | Van der Hoven | 65—4 |
| 2,931,442 | 4/1960 | Long | 65—3 |

HOWARD R. CANE, *Acting Primary Examiner.*

DONALL H. SYLVESTER, *Examiner.*

R. L. LINDSAY, *Assistant Examiner.*